(12) United States Patent
St Amant, III

(10) Patent No.: US 10,690,570 B1
(45) Date of Patent: Jun. 23, 2020

(54) MODULAR CONDITIONING COMPONENT IMPROVEMENTS AND METHODS ASSOCIATED THEREWITH

(71) Applicant: Mayeaux Holding, LLC, Gonzales, LA (US)

(72) Inventor: Valmond Joseph St Amant, III, St Amant, LA (US)

(73) Assignee: MAYEAUX HOLDING, LLC, Gonzales, LA (US)

( * ) Notice: Subject to any disclaimer, the term of this patent is extended or adjusted under 35 U.S.C. 154(b) by 0 days.

(21) Appl. No.: 16/128,305

(22) Filed: Sep. 11, 2018

Related U.S. Application Data

(60) Continuation-in-part of application No. 15/615,772, filed on Jun. 6, 2017, and a continuation-in-part of
(Continued)

(51) Int. Cl.
*G01N 1/22* (2006.01)

(52) U.S. Cl.
CPC .................................. *G01N 1/2247* (2013.01)

(58) Field of Classification Search
CPC ........... G01N 1/2247; G01N 2001/225; G01N 2001/2282; G01N 2035/00346;
(Continued)

(56) References Cited

U.S. PATENT DOCUMENTS

| | | |
|---|---|---|
| 2,515,835 A | 7/1950 | Preston |
| 3,080,760 A | 3/1963 | Piersma |

(Continued)

FOREIGN PATENT DOCUMENTS

CN  201043965  4/2008

OTHER PUBLICATIONS

ABB, Inc, Totalflow NGC8206 Chromatograph User's Manual, (Copyright 2009, Ver 21015-002-rev.AE, US, See pp. 1-17, 2-25 & 2-58 through 2-64.
(Continued)

*Primary Examiner* — Robert R Raevis
(74) *Attorney, Agent, or Firm* — Joseph T Regard, Ltd plc

(57) ABSTRACT

A system for on-stream sampling of pressurized process gas such as natural gas or the like, said system optimized for use with pressurized process gas having liquid entrained therein, or otherwise referenced as "wet". In the preferred embodiment, a probe and method of sampling is contemplated to provide linear sample of fluids from a predetermined of said fluid stream. Further taught is the method of preventing compositional disassociation of a gas sample having entrained liquid utilizing a probe having a passage formed to facilitate capillary action in fluid(s) passing therethrough. The present system further contemplates a system for providing power and/or heat to modular conditioning components as well provide sample flow therefrom utilizing a tube bundle via a tube bundle boot mounted on the bracket of a modular sample system. Further provided is a system for providing to a conditioning component an easily reconfigurable pressure reducing module, as well as a system for heating a modular conditioning component utilizing a heat trace.

38 Claims, 27 Drawing Sheets

Related U.S. Application Data application No. 15/653,083, filed on Jul. 18, 2017, which is a continuation-in-part of application No. 15/615,772, filed on Jun. 6, 2017, application No. 16/128,305, which is a continuation-in-part of application No. 15/228,814, filed on Aug. 4, 2016, now Pat. No. 10,073,013, application No. 16/128,305, which is a continuation-in-part of application No. 15/979,146, filed on May 14, 2018, which is a division of application No. 14/214,225, filed on Mar. 14, 2014, now Pat. No. 9,995,659, application No. 16/128,305, which is a continuation-in-part of application No. 16/005,431, filed on Jun. 11, 2018, which is a continuation-in-part of application No. 15/228,814, filed on Aug. 4, 2016, now Pat. No. 10,073,013, said application No. 16/005,431 is a continuation-in-part of application No. 15/615,786, filed on Jun. 6, 2017.

(60) Provisional application No. 62/202,478, filed on Aug. 7, 2015, provisional application No. 61/798,287, filed on Mar. 15, 2013.

(58) Field of Classification Search
CPC ......... G01N 2035/00425; G01N 2035/00445; G01N 1/44; G01N 2021/745; G01N 23/20033; A61M 16/183; F23D 14/78; F23D 2214/00
USPC ......... 73/863.11, 863.12; 392/324–337, 342, 392/386–406; 165/911; 236/44 R, 44 E; 159/3, 4.07, 4.08
See application file for complete search history.

(56) References Cited

U.S. PATENT DOCUMENTS

| | | | |
|---|---|---|---|
| 3,133,444 A | 5/1964 | Karwat | |
| 3,736,405 A | 5/1973 | Bryson, Jr. et al. | |
| 4,086,922 A | 5/1978 | Henderson | |
| 4,100,806 A | 7/1978 | Barbonnelle | |
| 4,283,947 A | 8/1981 | George | |
| 4,301,679 A | 11/1981 | Boyle | |
| 4,312,121 A | 1/1982 | Tweed | |
| 4,352,976 A | 10/1982 | McMullan | |
| 4,442,720 A | 4/1984 | Apley | |
| 4,537,071 A | 8/1985 | Waterman | |
| 4,625,570 A | 12/1986 | Witherspoon | |
| 4,688,537 A | 8/1987 | Calkins et al. | |
| 4,790,198 A | 12/1988 | Awtry | |
| 4,791,957 A | 12/1988 | Ross | |
| 4,993,842 A | 2/1991 | Morimoto | |
| 5,109,709 A | 5/1992 | Nimberger | |
| 5,154,087 A | 10/1992 | Wenshau | |
| 5,179,859 A | 1/1993 | Van Niekerk | |
| 5,237,878 A | 8/1993 | Hackenberg | |
| 5,440,941 A | 8/1995 | Kalidindi | |
| 5,501,080 A | 3/1996 | McManus et al. | |
| 5,531,130 A | 7/1996 | Welker | |
| 5,538,344 A | 7/1996 | Dybdahl | |
| 5,637,809 A | 6/1997 | Traina | |
| 5,746,586 A | 5/1998 | Fukuhara et al. | |
| 5,834,657 A | 11/1998 | Clawson | |
| 5,894,080 A | 4/1999 | Dybdahl | |
| 6,220,052 B1 * | 4/2001 | Tate, Jr. ................ F25J 1/0208 62/51.2 |
| 6,325,843 B1 | 12/2001 | Hickox | |
| 6,357,304 B1 | 3/2002 | Mayeaux | |
| 6,605,475 B1 | 8/2003 | Taylor | |
| 6,701,794 B2 | 3/2004 | Mayeaux | |
| 6,869,800 B2 | 3/2005 | Togerson | |
| 6,904,816 B2 | 6/2005 | Mayeaux | |
| 7,004,041 B2 | 2/2006 | Mayeaux | |
| 7,051,604 B1 | 5/2006 | Mayeaux | |
| 7,134,318 B2 | 11/2006 | Mayeaux | |
| 7,162,933 B2 | 1/2007 | Thompson | |
| 7,471,882 B2 | 12/2008 | Peebles et al. | |
| 7,555,964 B2 | 7/2009 | Mayeaux | |
| 7,717,000 B2 | 5/2010 | Xie | |
| 7,942,065 B2 | 5/2011 | Xie | |
| 7,958,794 B2 | 6/2011 | Sahibzada | |
| 8,196,480 B1 | 6/2012 | Mayeaux | |
| D674,052 S | 1/2013 | Thompson | |
| 8,522,630 B1 | 9/2013 | Mayeaux | |
| 8,534,039 B1 * | 9/2013 | Pierson ................ F02C 3/28 60/39.182 |
| 9,200,986 B1 | 12/2015 | Mayeaux | |
| 9,257,027 B2 | 2/2016 | Williamson | |
| 9,395,280 B2 | 7/2016 | Thompson et al. | |
| 9,459,185 B2 | 10/2016 | Thompson et al. | |
| 9,535,427 B2 | 1/2017 | Patterson et al. | |
| 9,655,168 B2 | 5/2017 | Belongia et al. | |
| 9,995,659 B1 | 6/2018 | St Amant, III | |
| 2003/0230101 A1 * | 12/2003 | Iritani ................ B60H 1/0075 62/228.3 |
| 2005/0258142 A1 | 11/2005 | Cho | |
| 2006/0229528 A1 | 10/2006 | Heske | |
| 2007/0158469 A1 | 7/2007 | Burgener | |
| 2007/0164562 A1 | 7/2007 | Valaskovic | |
| 2007/0217960 A1 | 9/2007 | Sekela | |
| 2010/0145634 A1 | 6/2010 | Pinguet | |
| 2010/0212757 A1 | 8/2010 | Patterson et al. | |
| 2010/0319468 A1 | 12/2010 | Peebles | |
| 2011/0036445 A1 | 2/2011 | Hall | |
| 2012/0033219 A1 | 2/2012 | Hokamura | |
| 2012/0325694 A1 | 12/2012 | Thompson | |
| 2013/0052083 A1 | 2/2013 | Kirby | |
| 2013/0220036 A1 | 8/2013 | Faust | |
| 2014/0041463 A1 | 2/2014 | Vethe | |

OTHER PUBLICATIONS

ACME Cryogenics, ACME Model CV Cryogenic Valve Brochure, date 2013, US, p. 2.
Federal Register, vol. 81, No. 222 BLM 43 CFR Parts 3175.111-112 "Onshore Oil and Gas Operations; Federal and Indian Oil and Gas . . . " Nov. 17, 2016, pp. 81578-81580 US.
ACME Cryogenics, Vacuum Insulated Pipe Brochure, date 2015, US.
ABB Inc, Portable NGC8206 Natural Gas Chromatograph DS_2101179, Copyright 2017, US.
Cryofab CFCL Series Vacuum Insulated Flexible Hose Product Sheet, date 2015, US.
A+ Corp LLC, Genie tm High Velocity Probe Product Sheet, PPS-SGP-HV-120803, Copyright 2003, US.
Intertec, SL Blocktherm Self-Limiting Block Heater Product Sheet, HD-662ca, date 2013, US.
Valtronics Inc, Mustang Sampling Sample Conditioning System MSCS P53, MSB-P53 vol. 1.2, (C) 2009, US.
Valtronics Inc, Mustang Sampling Pony Heated Probe Enclosure, MSB-PONYCS vol. 2.1, (C) 2009, US.
Welker Inc, Sample Conditioning Heated System Manual, Model SCHS, Manual IOM-132, Rev C, Apr. 20, 2016, p. 6.
Intertec, Diabox 87 Product Sheet, KD222-12en Diabox 87, date, 2017.
Mustang Sampling, LLC, MSCS Product Brochure, MSB-MSCS vol. 1.4, (C) 2009-2017, US.
Mustang Sampling, LLC, Solar Powered Sample Conditioning System SPSCS Product Brochure MSB-PonySOL vol. 2.1, (C) 2014-2017, US.
Mustang Sampling, LLC, Sample Conditioning System P53 Product Brochure MSBC-P53-CE vol. 2.2 (C) 2009-2017, US.
Mustang Sampling, LLC, Pony Heated Probe Enclosure Product Brochure MSBC-C-PONYCS vol. 4.4 (C) 2009-2017, US.
A+ Corp, LLC Genie (tm) Heated Regulator GHR Product Sheet, SCC-GHR-PS_0906 (C) 2006, US.
A+ Corp, Genie (tm) GHR Heated Regulator Product Sheet, SCC-GHR0PS_1116, (C) 2012, US.

(56) References Cited

OTHER PUBLICATIONS

A+ Corp, LLC, Genie (tm) GPHV General Purpose Probe product sheet, SCC-GPHV-PS_0116 (C) 2012, US.
A+ Corp, LLC, Genie (tm) Vaporizer Product Sheet, SCC-GV-PS_0106, C 2006, US.
A+ Corp LLC, Genie (tm) 760 Direct Drive Probe Product Sheet, SCC-7600PS_0116, A+ Corp LLC, Gonzales, LA, (C) 2012, US.
US Dept Interior, BOL Operator Letter (redacted), Jan. 19, 2017 regarding FMP's (Facility Measurement Points), Jan. 19, 2017, US.
Thermon Manufacturing Co Brochure Form PAF0027-0714 "Installing Non-Heated Wires Within a Tube Bundle", Thermon Manufacturing Co, 2014, US.
Mustang Sampling LLC, Mustang Intelligent Vaporizer Sampling System Model 2 Product Sheet, Mustang Sampling, LLC, Ravenswood WV, (C) 2009-2016, US.
Welker Inc, SCHS Sample Conditioning Heated System, Product Sheet, Welker, Inc, Sugar Land, TX, (C) 2016, US.
Matheson Gas, "The BTU Accuracy Connection to Profitability . . . ", Product Sheet, Matheson Gas, Montgomeryville, PA, 2010, US.
McMaster-Carr Supply Co, Web catalog at https://www.mcmaster.com/#catalog/123/1/=1ap8126, Stainless Steel Tubing, p. 153, 2016, US.
Research Gate discussion regarding capillary in Gas Chromatograph, Printed Dec. 15, 2017, https://www.researchgate.net/post/What_is_a_capillary_column_for_GC_and_how_does_it_work.
United States Patent Office, "Non-Final Rejection" in U.S. Appl. No. 14/214,225 (now patent U.S. Pat. No. 9,995,659), St Amant, III inventor, dated Jun. 5, 2017, 11 pages.
United States Patent Office, "Final Rejection" in U.S. Appl. No. 14/214,225 (now patent U.S. Pat. No. 9,995,659), St Amant, III inventor, dated Nov. 10, 2016, 13 pages.
United States patent Office, "Non-Final Rejection" in U.S. Appl. No. 15/615,772, St Amant, III inventor, dated Jan. 24, 2019, 13 Pages.
United States Patent Office, "Non-Final Rejection" in U.S. Appl. No. 15/653,083, St Amant III, Inventor, dated Apr. 8, 2019, 29 Pages.
Raevis, Robert (USPTO AU 2861), Ex Parte Quayle Action in U.S. Appl. No. 15/854,663, dated Oct. 9, 2019, 4 Pages.
Raevis, Robert (USPTO AU 2861), Final Rejection in U.S. Appl. No. 15/653,083, St Amant III Inventor, dated Jul. 16, 2019, 7 pgs w/ notice cited refs.
Mercado, Alexander (USPTO AU 2856), "Non-Final Rejection" U.S. Appl. No. 15/615,786, St Amant III, Inventor, dated Sep. 23, 2019, 14 pgs w/ notice cited refs.

\* cited by examiner

FIGURE 1
FIGURE 2
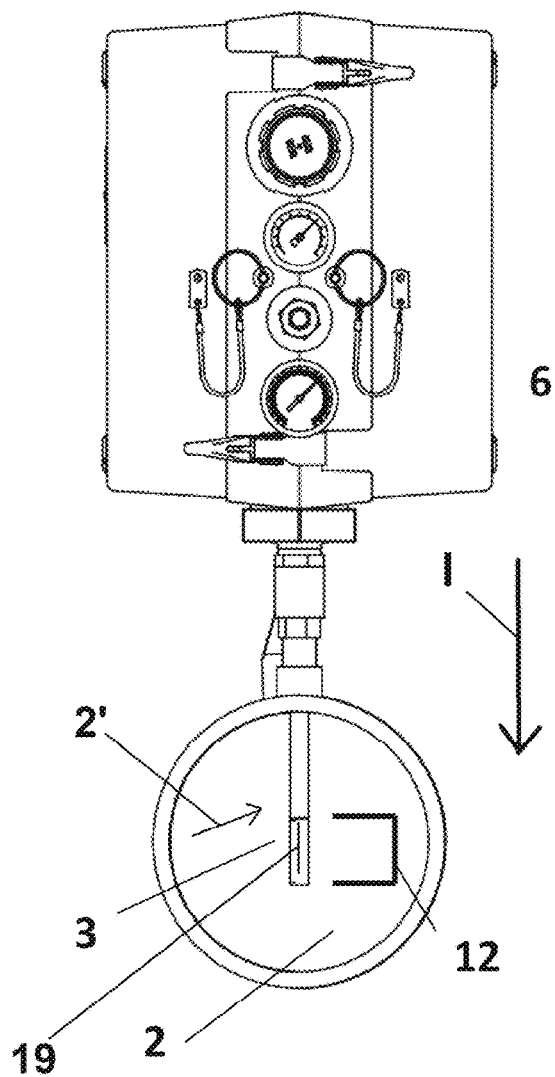
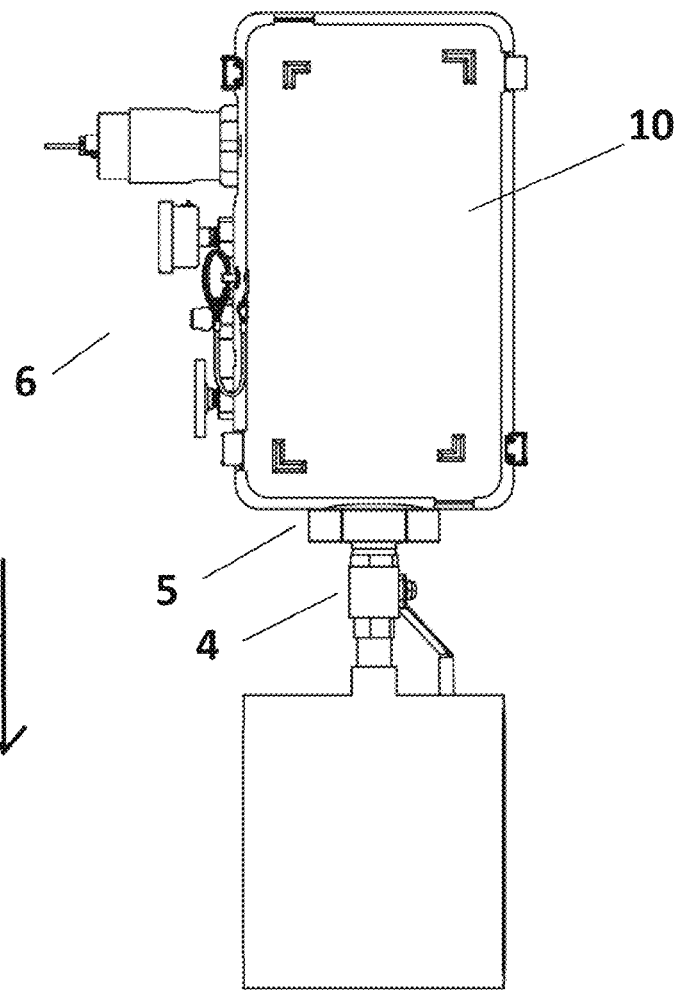

FIGURE 7A
FIGURE 7B
FIGURE 7C
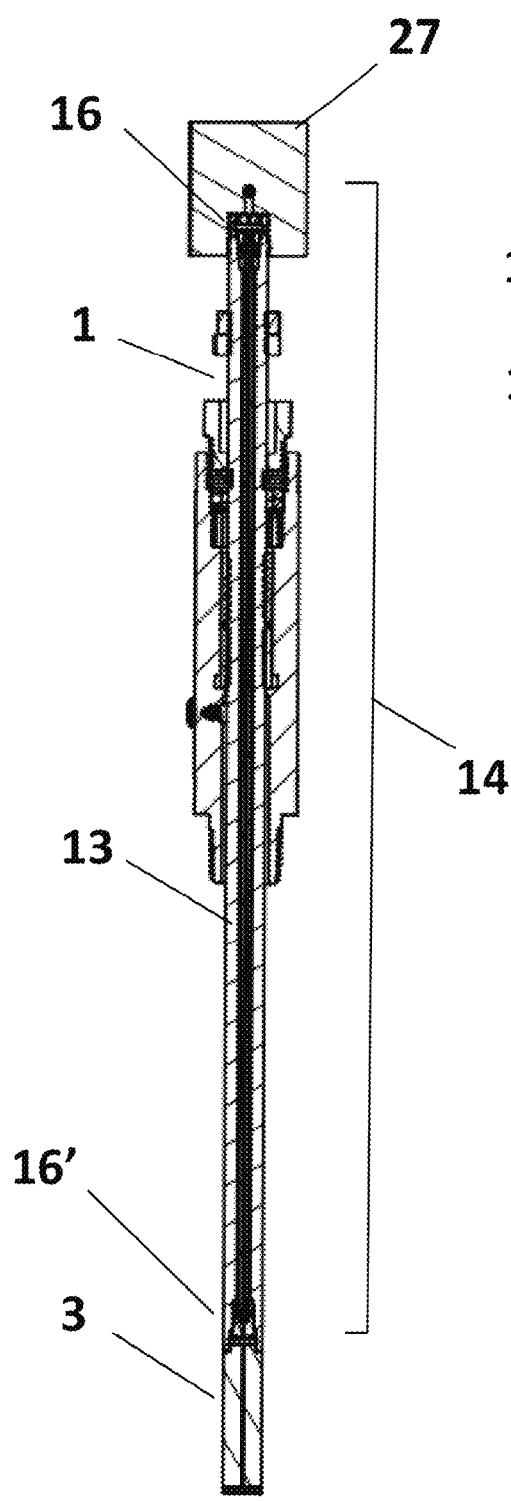
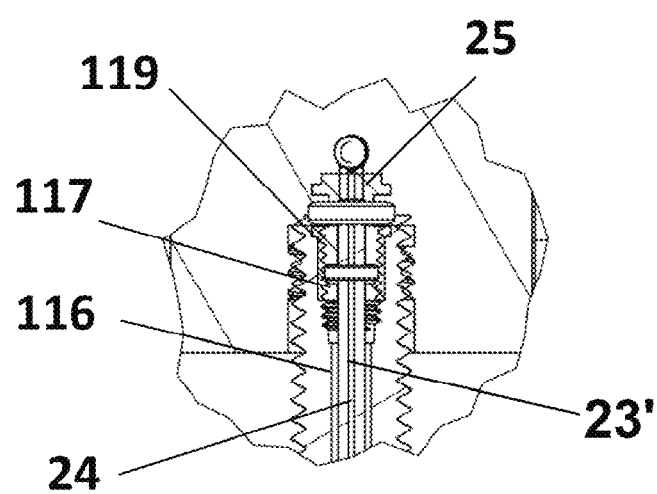
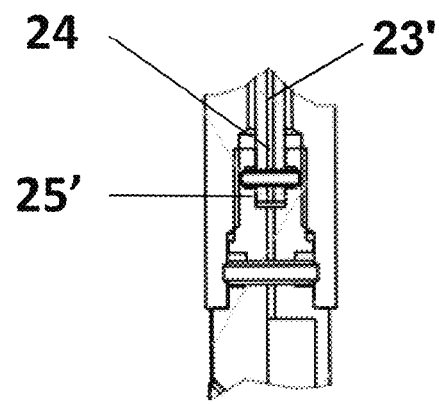

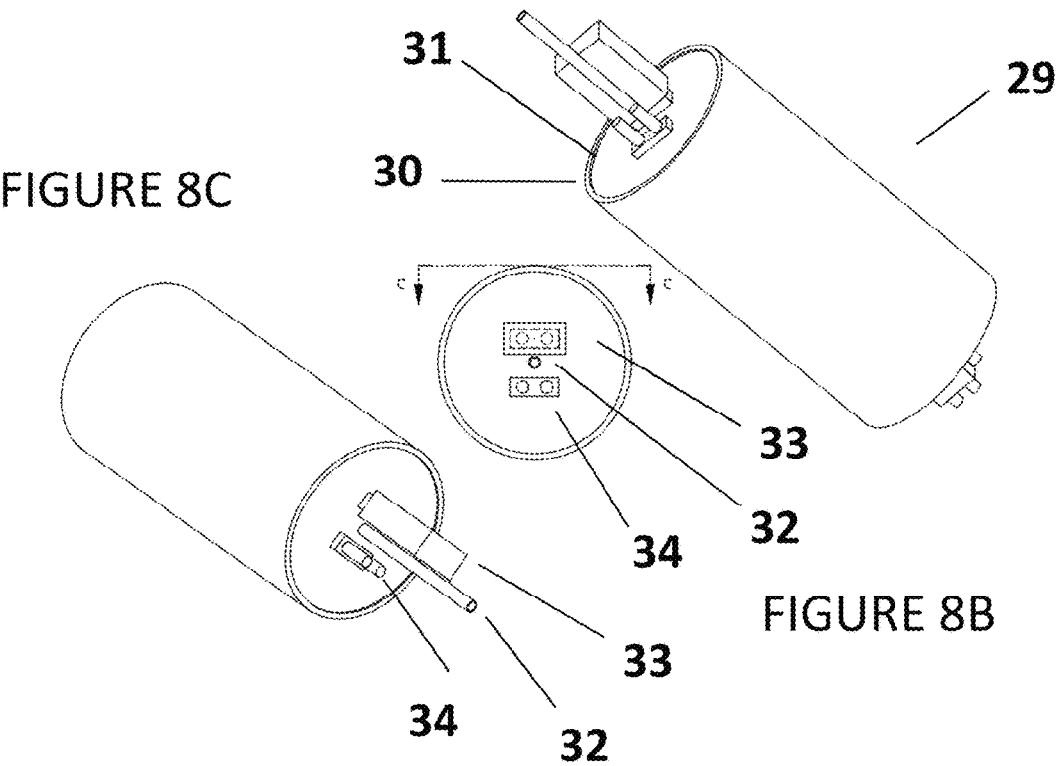
FIGURE 8A
FIGURE 8B
FIGURE 8C
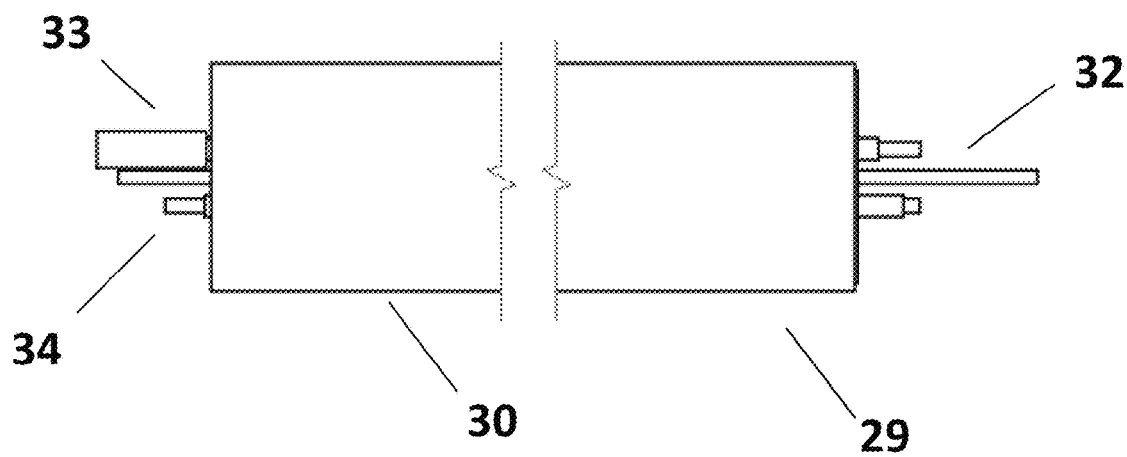
FIGURE 9

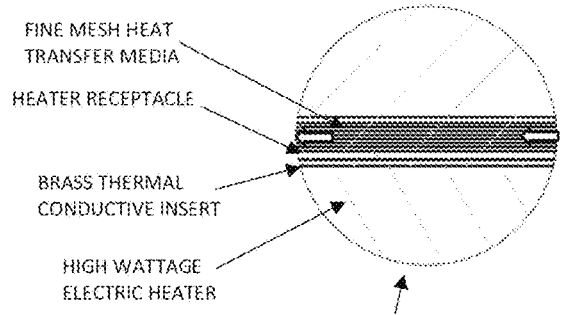
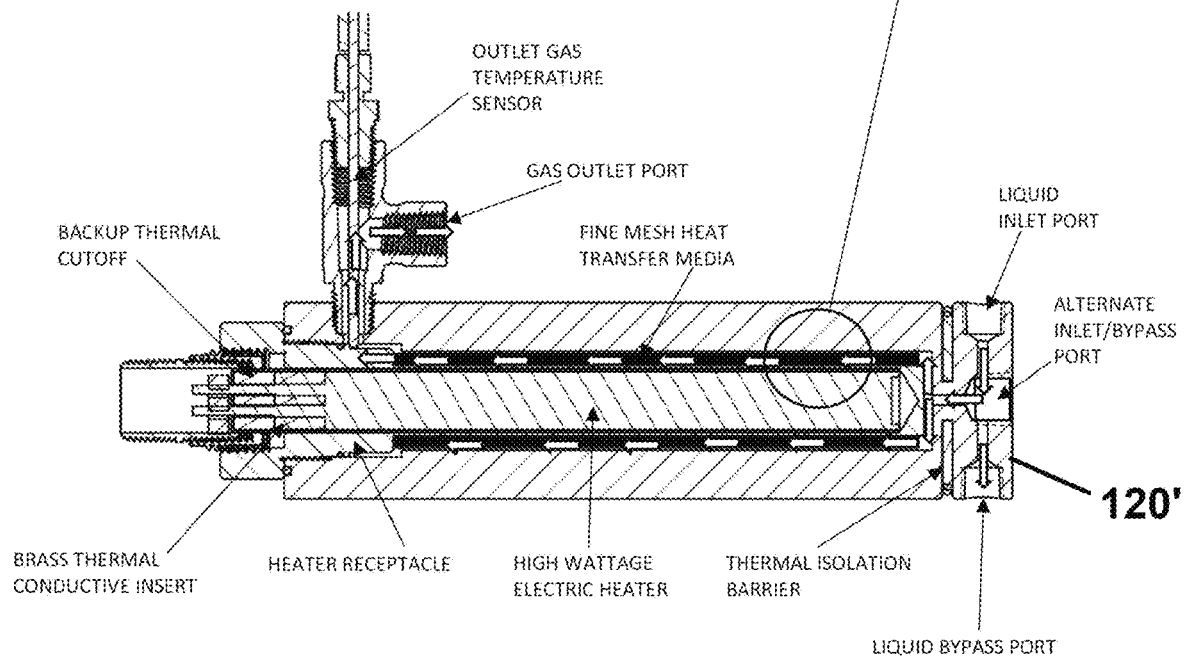
Genie Vaporizer (GV)
LIQUID FLOW PATH
PROCESS FLUID FLOW INDICATED WITH ARROWS
PRIOR ART
FIG 12

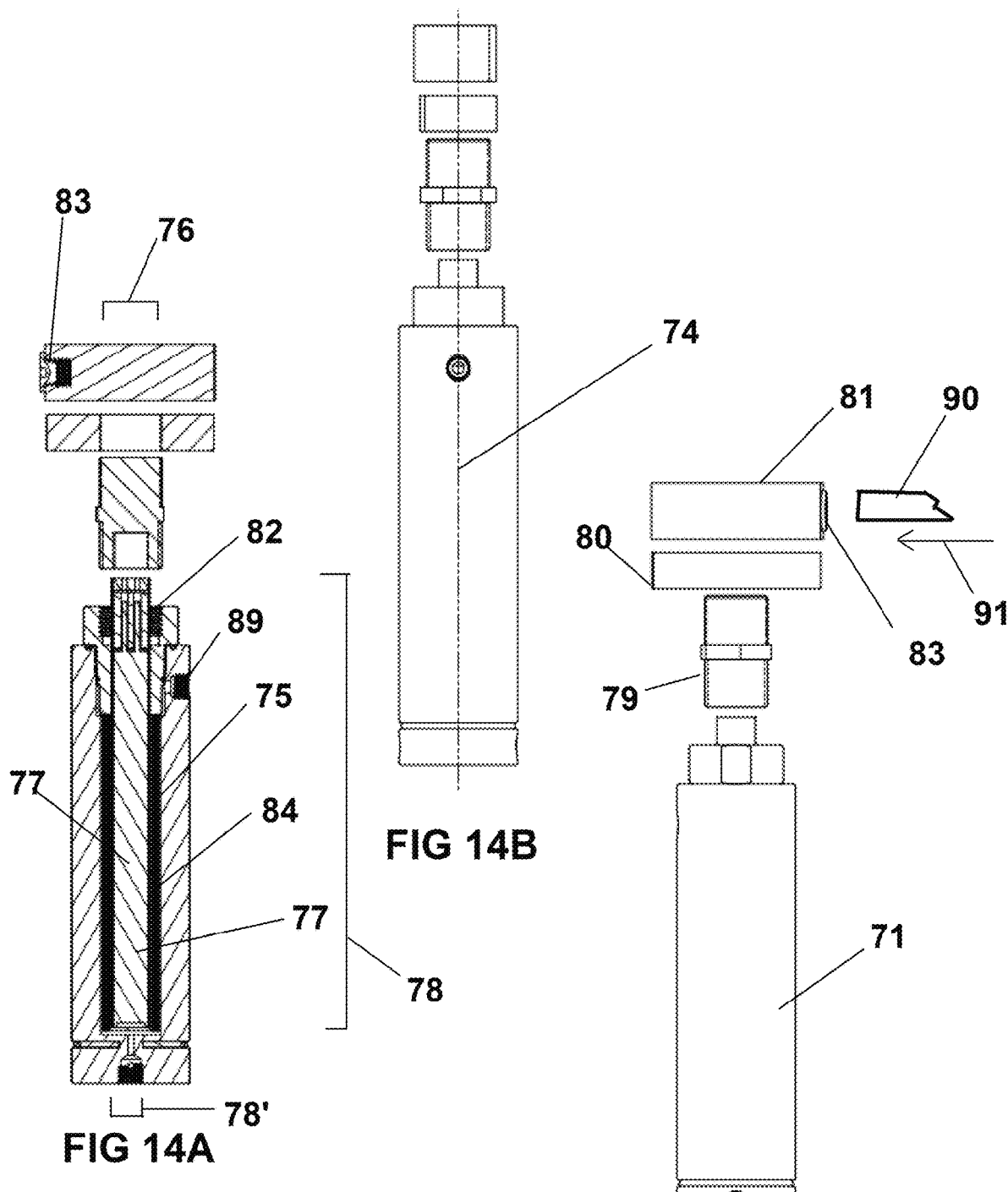

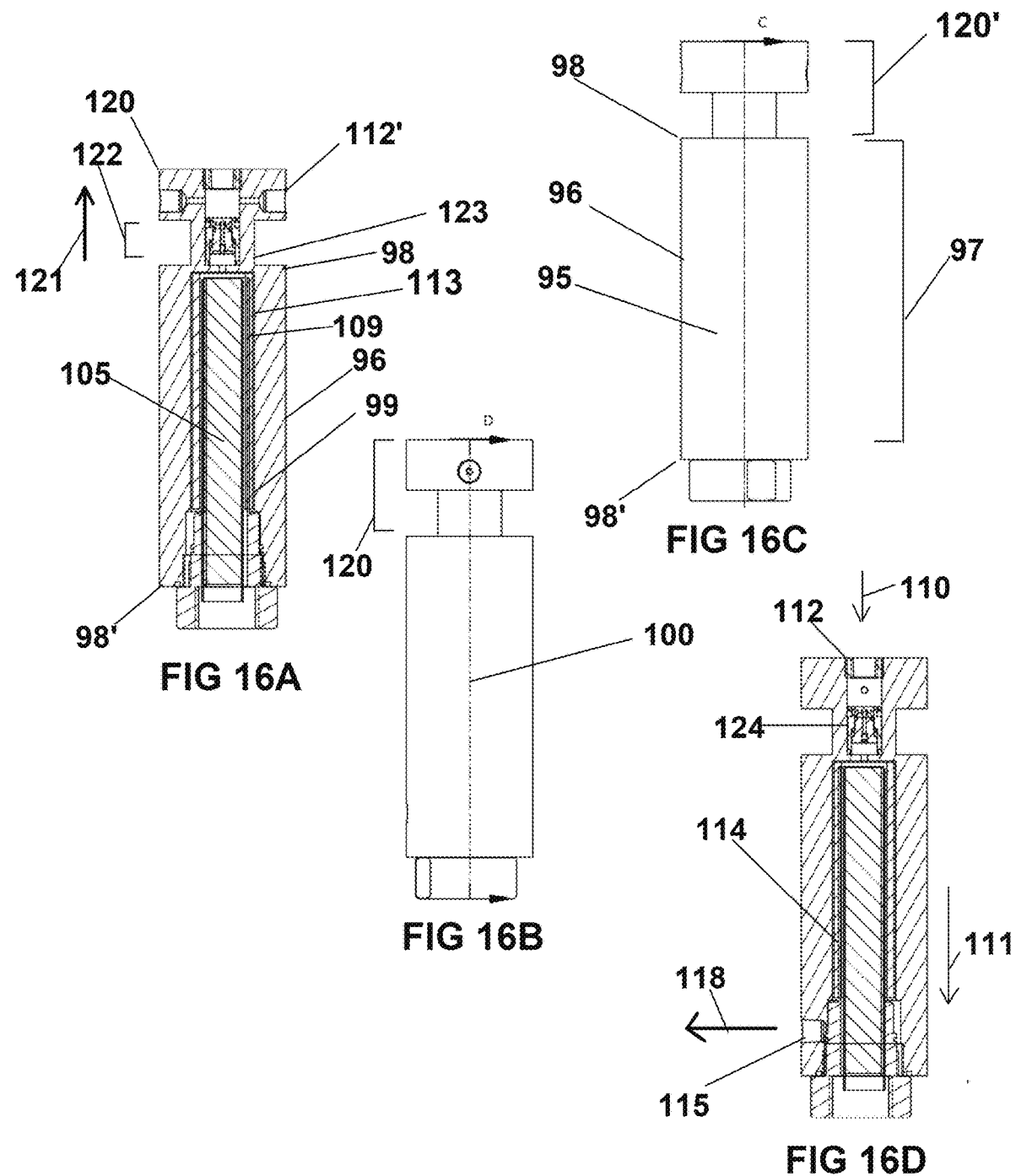

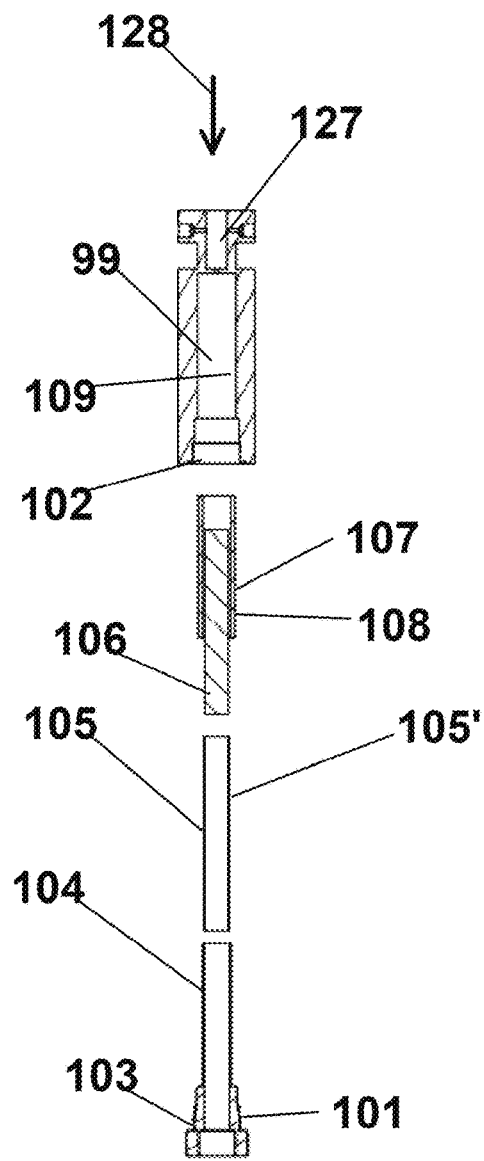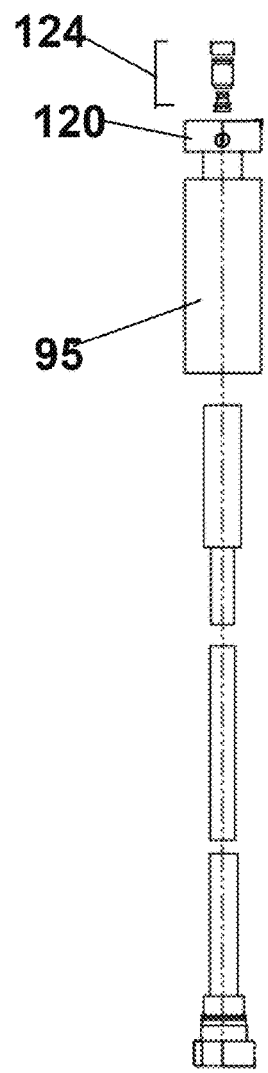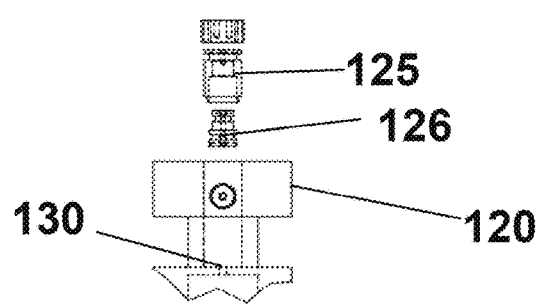
FIG 17A
FIG 17B
FIG 17C

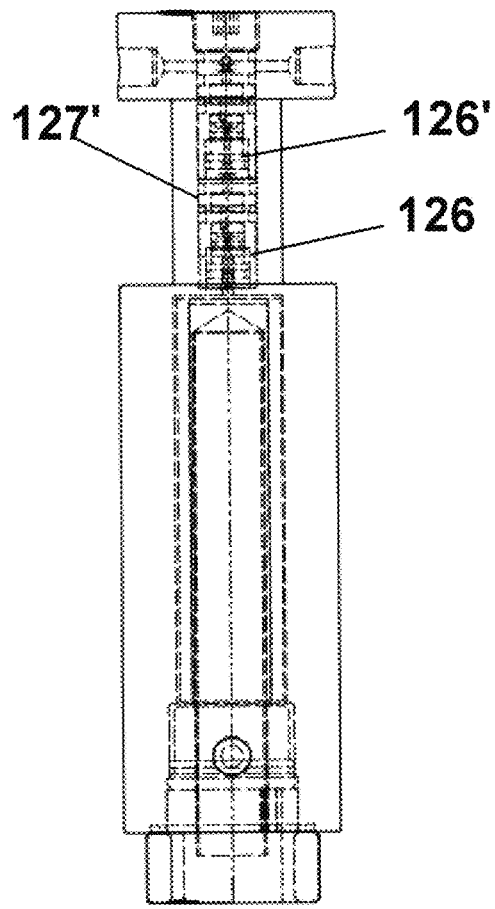 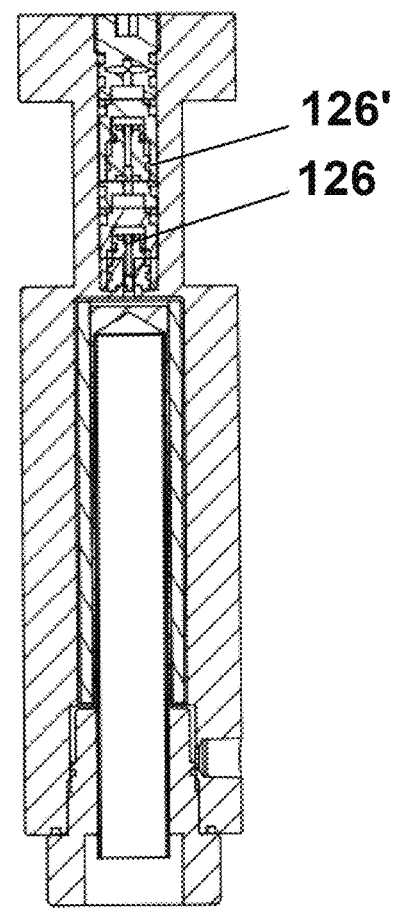
FIG 17F  Fig 17G

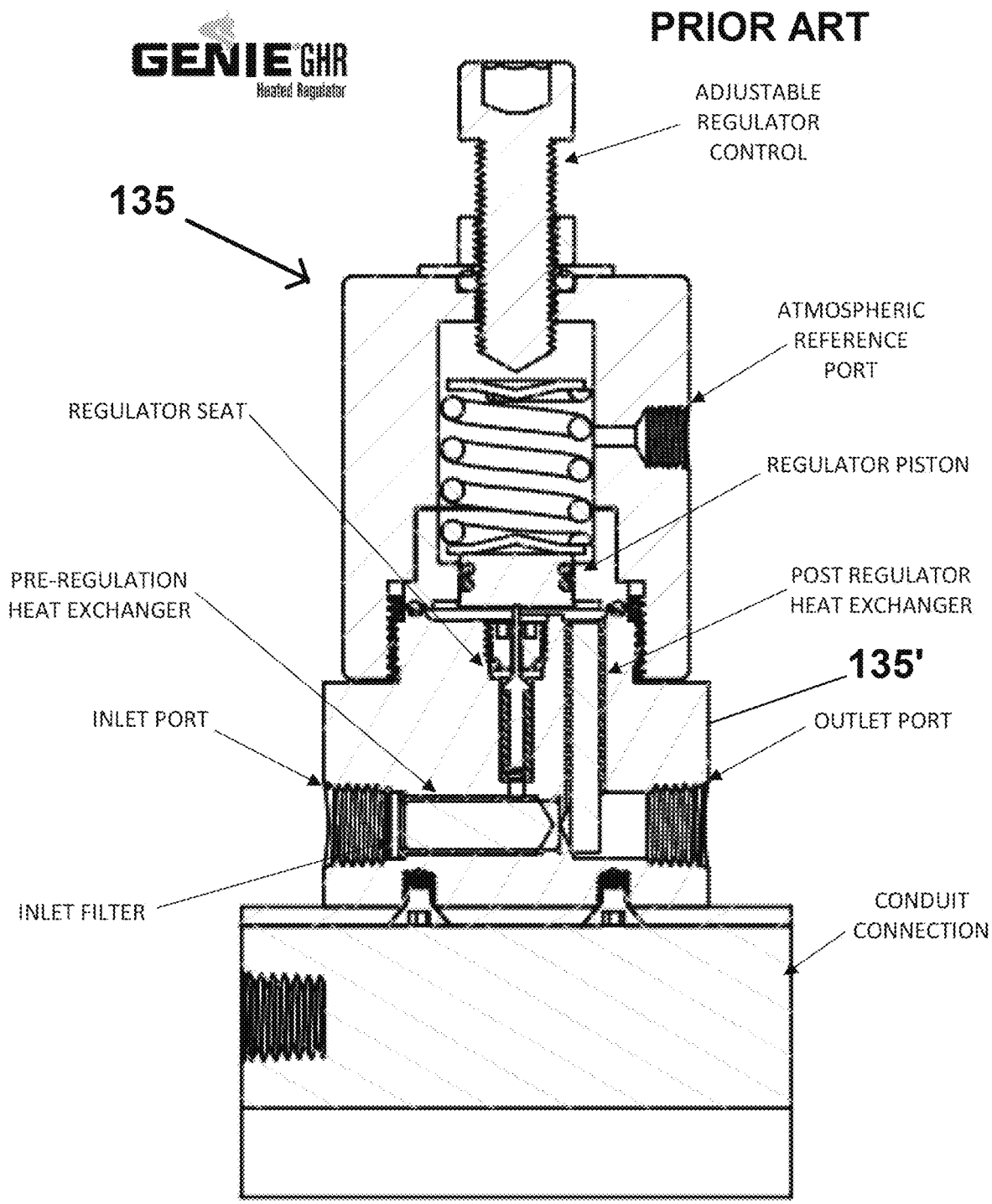

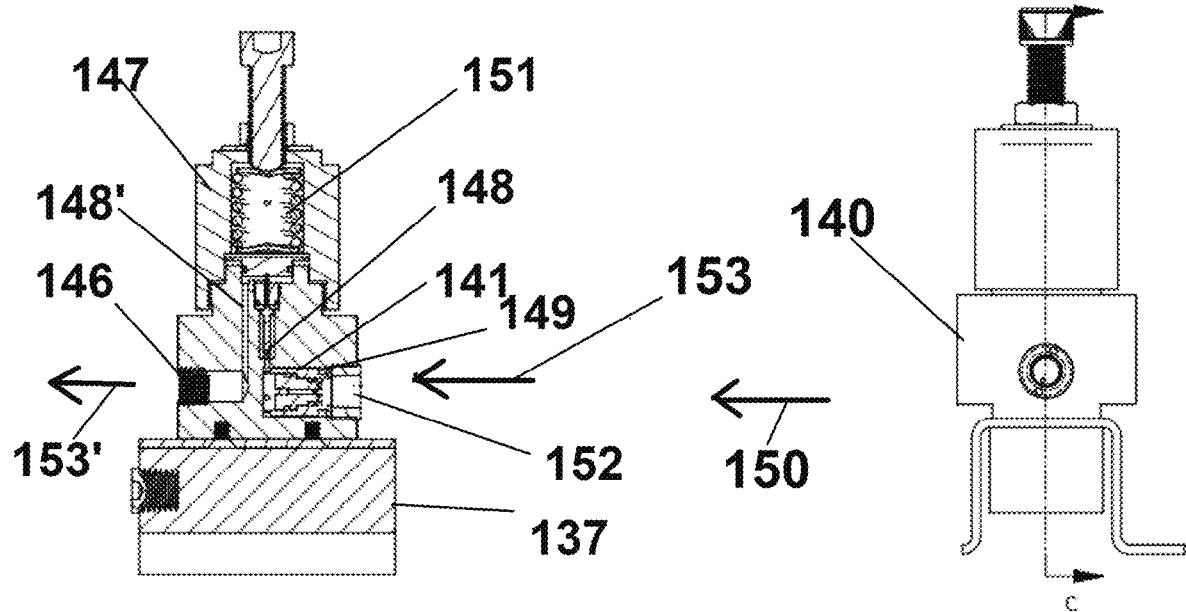
FIG 20A
FIG 20B
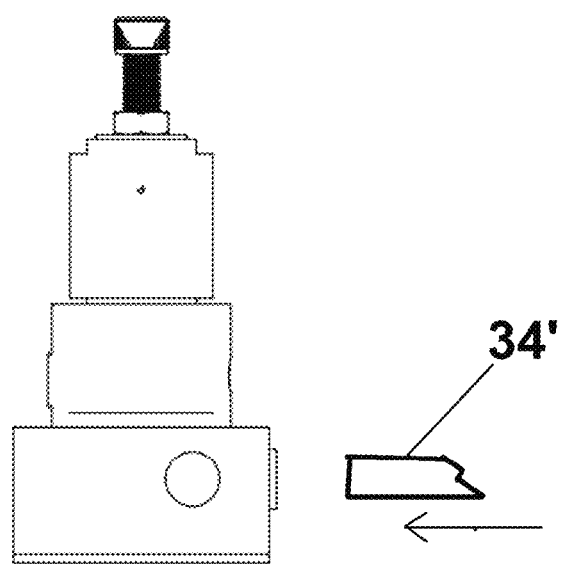
FIG 20C

MODULAR CONDITIONING COMPONENT IMPROVEMENTS AND METHODS ASSOCIATED THEREWITH

DOMESTIC PRIORITY AS CLAIMED BY APPLICANT

The present application is a continuation-in-part of U.S. Utility patent application Ser. No. 15/615,772 filed Jun. 6, 2017 entitled WET GAS SAMPLE SYSTEM, listing Valmond Joseph St Amant, III as inventor.

The present application is also a continuation-in-part of U.S. Utility patent application Ser. No. 15/653,083 filed Jul. 18, 2017 entitled WET GAS SAMPLE SYSTEM listing Valmond Joseph St Amant, III as inventor, said '083 case a continuation-in-part of U.S. Utility patent application Ser. No. 15/615,772 filed Jun. 6, 2017 entitled Wet Gas Sample System, listing Valmond Joseph St Amant, III as inventor.

The present application is also a continuation-in-part of U.S. patent application Ser. No. 15/228,814 filed Aug. 4, 2016 entitled Source Mounted Modular Sample Conditioning System, listing Valmond Joseph St Amant, III as inventor, said '814 case claiming the benefit of Provisional Patent Application Ser. No. 62/202,478 filed Aug. 7, 2015, listing Valmond Joseph St Amant, III as inventor.

The present application is also a continuation-in-part of U.S. Utility patent application Ser. No. 15/979,146 filed May 14, 2018 entitled WET GAS LATERAL SAMPLING SYSTEM AND METHOD, listing Valmond Joseph St Amant III as inventor, said '146 case being a divisional of U.S. Utility patent application Ser. No. 14/214,225 filed Mar. 14, 2014, now U.S. Pat. No. 9,995,659, listing Valmond Joseph St Amant III as inventor, said '225 application having claimed the benefit of U.S. Provisional Patent Application Ser. No. 61/798,287 filed Mar. 15, 2013, listing Valmond Joseph St Amant III as inventor.

The present application is also a continuation-in-part of U.S. Utility patent application Ser. No. 16/005,431 ('431) filed Jun. 11, 2018 entitled Modular Sample System Incorporating Mounting Bracket Independent of Housing, and Method Therefore, listing Valmond Joseph St Amant, III as inventor, said '431 case being a continuation-in-part of U.S. patent application Ser. No. 15/228,814 ('814) filed Aug. 4, 2016 entitled Source Mounted Modular Sample Conditioning System, listing Valmond Joseph St Amant, III as inventor, said '814 case claiming the benefit of Provisional Patent Application Ser. No. 62/202,478 filed Aug. 7, 2015, listing Valmond Joseph St Amant, III as inventor, said '431 case also being a continuation in part of application Ser. No. 15/615,786 filed Jun. 6, 2017 entitled Source Mounted Wet Gas Sample System, listing Valmond Joseph St Amant, III as inventor.

FIELD OF THE INVENTION

The present invention relates to sampling of pressurized process fluids, and more particularly a system for on-stream and/or spot sampling of pressurized process gas having liquid entrained therein, otherwise known and referenced as multiphase or "wet" including but not limited to natural gas or the like. The present invention contemplates a unique and innovative probe formed to take a linear sample of fluids at a predetermined area of said fluid stream, including the center-third pursuant to recent Bureau of Land Management (BLM) requirements. The present invention further provides for use in combination therewith a tube bundle with tube bundle boot interface, which can incorporate a separate power cord to power a modular vaporizing pressure reducing module. The present invention provides a sampling system designed for use in compliance with newly-revised BLM orders, and is particularly provided for use in BLM regulated Facility Measurement Points (FMP). Also disclosed is a heated, modular vaporizing pressure reducing module and a bypass option particularly suitable for NGL applications, as well as a heated regulator with pressure reducer facilitating the vaporization of wet gas flowing therethrough.

BACKGROUND OF THE INVENTION

Natural Gas is comprised of a mixture of gases (See API 14.1 Section 6.3 and naturalgas.org). Natural gas is bought and sold based on its heating value (BTU), which is derived from a compositional analysis of the natural gas. It is the BTU content that determines the monetary value of a given volume of natural gas. This BTU value is generally expressed in decatherms (one million BTU).

To determine the total heat value of a given volume of gas, a sample of the gas is analyzed, and from the compositional data, its heat value per unit volume is calculated. This value is generally expressed in BTU/cu ft. The typical range of transmission quality gas ranges between 1000 and 1100 BTU/cu ft. Production gas, storage facility gas, NGL, and new found Shale Gas can have much higher heating values up to or even exceeding 1500 BTU/cu ft.

There has been a long-standing controversy between gas producers and gas transporters regarding entrained liquid typically present in most high BTU/cu ft. gas (rich or "wet" gas). Transporter tariffs require essentially liquid-free gas. Liquid in the gas being transported causes operational and safety problems. The practice is to separate the liquid before entering a transport (pipe) line.

The API 14.1 standards (Manual of Petroleum Measurement Standards, 2006) scope does not include supercritical fluid (dense phase) or "wet gas" "(a term referenced by the Natural Gas industry as a gas that is at or below its hydrocarbon dew point temperature and/or contains entrained liquid), nor does the GPA 2166 standard (Obtaining Natural Gas Samples for Analysis by Gas Chromatography, 2005). In summary, there is believed no known standard which defines how to obtain a "representative sample" of a natural gas supply having entrained liquid in any form.

Therefore, to fully comply with the current industry standards, membrane-tipped probes such as the A+ Corporation GENIE brand Probe (see U.S. Pat. Nos. 6,357,304, 6,701,794, 6,904,816, 7,004,041, and 7,134,318) have been used for many years to shed entrained liquids inside pressurized pipelines. Electrically powered heaters may be provided, which may be powered by a separate power line included in the tube bundle or by utilizing the heat trace itself. These heaters are used to prevent hydrocarbon gas condensation in liquid-free gas samples.

Companies such as Mustang Sampling, LLC have bolted enclosures to the membrane-tipped probes (such as those provided by A+ Corporation of Gonzales LA), and are believed to utilize third party, electrically-powered heater blocks (Intertec Hess) and A+ Corporation cartridge-type heated regulators (See applicant's 2004 prior art, GHR and GV) for the enclosure, as well as third party electrical heat trace products. See for example A+ U.S. Pat. No. 6,357,304, Hess U.S. Pat. Nos. 4,307,264A and 4,821,905, www.pentairthermal.com, and Tyco Electronics Raychem GB2199451A, all of which pre-date Thompson D674052, U.S. Pat. No. 7,162,933B2, 2012/0325694. See also U.S. Pat. No. 9,459,185 relating to a solar powered sample analyzing system.

Solar power has been traditionally used in natural gas sampling for decades. See U.S. Pat. No. 5,501,080A, McManus et al, with 1994 Priority date as well as vendors such as ABB, Inc (having a website at abb.com/solar), see for example the ABB NGC8206 User Manual, Copyright 2009, Pages 1-17 and 2-58 through 2-64, available for download at their website, which pre-dates Thompson U.S. Pat. Nos. 9,459,185 and 9,733,224. Also see the assignee's Mayeaux U.S. Pat. No. 7,051,604, wherein the second embodiment teaches the use of vacuum jacketed means for a fluid sample system from a pipeline. Thompson U.S. Pat. Nos. 9,459,185 and 9,733,224 include the use of solar power, which McManus disclosed in U.S. Pat. No. 5,501,080A, as well as vacuum jacketed tubing, which Mayeaux disclosed in U.S. Pat. No. 7,051,604.

Other housing or enclosure providers include, for example, vendors such as Intertec Hess GmbH's instrumentation component offerings on the internet at www.Intertec.info. Intertec Hess is not only a provider of enclosures, but is also a provider of the electrically-powered heater blocks. Splicing kits suitable for such an application may be found at Protherm Industries Inc website www.protherm.com, which offers, for example, a FE Series Splice Kit which could be used in this application; splice kits also available from other third-party providers such as Raychem S150-ML at their website www.raychem.com; see Tyco Electronics Raychem GB2199451A.

Mustang Sampling, LLC Brochures MSB-PONY and MSB P53, available at their website www.mustangsampling.com, can include products incorporating A+ Corporation GENIE brand membrane tipped probes, and utilize third party, electrically-powered Hess heater blocks and A+ Corporation cartridge-type heated regulators and third-party heat trace, as described above. Mustang Sampling brochure MSB P53 illustrates a product which can include A+ Corporation GENIE brand membrane liquid block separators (U.S. Pat. No. 7,555,964, a OP of U.S. Pat. No. 7,097,693 (listing the present Inventor St. Amant as second Inventor)) in an enclosure, which is ideally mounted in the vicinity of the analyzer, which may include additional electrically-powered heater blocks and electrically powered heated regulators (See Mayeaux U.S. Pat. No. 6,357,304, Mayeaux U.S. Pat. No. 8,220,479, Thompson U.S. Pat. No. 7,162,933, and Thompson US 2012/0325694 A1).

Other prior art is suitable for use with or even can include the applicant assignee's (Mayeaux Holding, LLC/A+ Manufacturing, LLC) own GENIE brand Vaporizer (FIG. 12) and GENIE brand Heated Regulator (FIG. 18), both commercialized in 2004 (See Patterson U.S. Pat. No. 9,535,427 B2 page 2 Column 2 listing A+ Corporation, LLC "Genie Heated Regulator" Product Bulletin for Model GHR of Genie Heated Regulator, 2005 (2 pages), and Thompson U.S. Pat. No. 8,056,399B2 with a filing date of Feb. 2, 2009; U.S. Pat. No. 9,057,668B2 with a filing date of Sep. 30, 2011; and U.S. Pat. No. 9,285,299B2 with a filing date of Mar. 14, 2013), and GENIE brand JTR multi-stage regulator Mayeaux U.S. Pat. No. 8,220,479 and the GENIE brand membrane separator with liquid block (U.S. Pat. No. 7,555,964, a OP of U.S. Pat. No. 7,097,693 listing the present Inventor St. Amant as second Inventor with a priority date of 1996) in an enclosure.

Other companies such as Welker Engineering use non-membrane probes (fixed probes) and bring the liquids outside the pipeline to reject the liquids inside enclosures containing an electrically powered heated regulator and then returning the liquid back to the pipeline, while hanging a hinged enclosure onto the probe (see Welker SCHS manual, page 6, at their website, and U.S. Pat. No. 7,471,882). The purpose of these sample systems is to reject entrained liquids and maintain the sample system temperature above the sample dew point to prevent further condensation.

The above prior art (as well as others) have relied upon power being readily available for electrical cartridge heater devices and electrical heater blocks, to provide heat for the sample systems to prevent condensation in liquid-free gas samples, not to vaporize liquids. Vacuum jacketed tubing has also been used commercially for liquified natural gas sample systems for decades to insulate and preserve sample temperature. Vacuum jacketed tubing providers include companies like Acme Cryogenics and Cryofab. Also see Thompson U.S. Pat. No. 9,395,280 B2 and Mayeaux U.S. Pat. No. 7,051,604, wherein (in '604), the second embodiment teaches the use of vacuum jacketed means for a fluid sample system from a pipeline.

Recently, the Bureau of Land Management (BLM) has revised 43 CFR 3175 (Order 5) The Onshore Oil and Gas Operations, Federal and Indian Oil and Gas Leases, Measurement of Gas effective Jan. 17, 2017, as indicated in the Federal Register, Vol 81, No 222, Sections 3175.111 and 3175.112, pages 81578-81580, issued 17 Nov. 2016.

Sections 3175.111 and 3175.112 now mandate a sampling protocol believed outside of the scope of API 14.1 and GPA 2166, by mandating sampling of two-phase samples (gas with entrained liquids) without rejecting the liquids, to provide a sample to the analyzer.

The above BLM order tries to reference parts of API 14.1 and GPA 2166, but it is clearly outside the scope of both of those industry standards. Further, said BLM order forbids the use of membranes or any other type of filter and means of liquid rejection in the probes used to take the sample. Therefore, under this BLM order as it presently stands, it appears that contaminants like glycols and amines cannot be rejected, filtered, or removed from the sample that is taken from the pipeline. In addition, the present BLM order requires liquids and gases to be removed from the center third of the pipeline, as well as heated sample lines to vaporize any liquids removed before they reach the analyzer.

Some of these sample points under the above referenced BLM order are in Facility Measurement Points (FMP) areas having electrical power availability. The power available may be 110V AC at high volume FMP sites or 24V DC at low volume FMP sites. The 24V DC available may be from solar power. Some of the sample points will only have solar power available for the short distance of self-limited heat trace tubing.

Under the above referenced BLM order, these BLM sample points will be required to not just heat the sample to prevent condensation of liquid-free gas, but to vaporize the entrained liquids removed with the gas samples. The BLM regulated locations with low volume FMPs may utilize portable low power gas analyzers that are powered from the technician's vehicle instead of on-site stationary conventionally powered gas analyzers such as gas chromatographs or other types of gas analyzers.

General Summary Discussion of the Invention

The present invention is configured to provide a single-phase gas sample to the analyzer without rejecting the liquids, the present system designed to be compliant with and particularly suitable for use in BLM regulated FMP areas, providing a unique sample system which is compliant with new BLM order 5, and without the problems and shortcomings associated with the prior art sample systems referenced above.

The present invention does not require the use of membrane filters or any other filter or method that would reject liquids. The present system contemplates a unique probe formed to take a linear sample of fluids at the medial area of said fluid stream, including the center-third, when required. The unique design and method of operation makes it particularly suitable for BLM order 5, providing compliant sample probes and methodologies. The present invention is also uniquely designed to not just provide heat to prevent condensation in liquid-free gas samples, but to vaporize the multiphase sample utilizing the tubing bundle.

Unlike the above discussed, prior art sampling systems, the present invention teaches a new and innovative "integral slice" sampling process, wherein a very thin slice of the total volume of the source fluid flowing through a conduit or pipeline is captured by a streamlined container arrangement suspended in said source fluid, in a similar manner to an integral in calculus—a limiting procedure which approximates the area of a curvilinear region by breaking the region into thin vertical slices—with nominal flow disturbance, and in which trapped fluid is subsequently withdrawn and isolated in a location outside of the source fluid flowing stream.

Further, unlike dynamic isokinetic techniques, the system of the present invention insures that the representative sample taken either in spot, batch or continuous fashion is not allowed to disassociate due to the very small internal cavity of the slot and outflow passage following the slot. Empirical testing verifies that, if the diameter of the passage is sufficiently small, then the combination of surface tension (which is caused by cohesion within the liquid and adhesive forces between the liquid and container wall) and the higher velocity sweep will act to propel the liquid as well as the gas, preventing disassociation. The pipeline area is very large compared to the probe's very small interior and because of this vast difference; fluid in the probe will always be of a higher velocity than the pipeline fluid.

The high gas velocity (higher than the source velocity of the pipeline) of the very small internal cavity would then sweep all of the liquid particles at the same velocity as the gas particles being transported from the source to the probe. Therefore, it would remain "associated" with the gas from which it condensed. Small particles such as that which comprise smoke are known to behave somewhat like large molecules. High velocity gas in the small internal diameter bore of the probe will prevent any significant layer of liquid from accumulating on the surfaces. Even if an ultra-thin layer were to coat the probe's interior, the total area is so small that the impact would be negligible.

The present invention provides a far superior sampling solution for wet gas streams, including high HC dew point gases, which traditionally have been difficult to sample dynamically due to phase changes and resulting composition changes which can be triggered by flow, pressure, and/or temperature.

The present invention is a unique sample system designed to solve the problems of prior art sample systems while complying with the new BLM order 5.

The inlet of the preferred embodiment of the present invention features a capillary passage following the linear-slot probe. The capillary passage may be in the form of a passage formed in the probe or capillary tubing inserted therein. In either case, the passage is formed to facilitate capillary action or motion, and higher velocity in "wet gas" flowing therethrough, to prevent the two-phase sample from disassociating as it is transported to the modular vaporizing pressure reducing regulator.

As discussed above, prior art systems that were designed to reject or remove liquids from the gas sample utilized electricity to power electrical devices such as heater blocks. Similarly, prior art systems utilized electricity to power heated regulators, so as to prevent condensation in liquid-free samples due to JT effect cooling associated with the pressure reduction of a gas, or cold ambient environments that could cool the sample below its hydrocarbon (HC) dew point.

However, the present invention utilizes diverse means to heat the conditioning component, and not to just overcome JT cooling due to the pressure reduction in liquid-free gas samples, or to offset ambient temperatures, but also to vaporize liquids the fluid stream, particularly for application at BLM regulated FMP sites (as this is a BLM statutory requirement) so as to provide a gas sample. Accordingly, the present invention is designed to provide heating capacity for use in overcoming the enthalpy of vaporization via vaporizer or the like. Such an additional heating capacity could surpass the limited available power available from most prior art heat trace applications, which traditionally were tapped for their relatively low-power electrical needs.

One embodiment of the present invention therefore provides a separate power cord in a customized tube bundle for utilization as the heat block power source. The power cord may be utilized to provide, for example, 110V AC or 24V DC to the modular sample system, via a tube bundle. The power cord may thereby provide power to a modular vaporizing regulator, vaporizers, regulators or other powered modular components of a two-phase sample system. An exemplary regulator which might be utilized in the preferred embodiment of the present invention might comprise, for example, a single stage regulator such as the A+ Corporation Genie Heated Regulator (FIG. 18), as referenced in Tescom Corporation's U.S. Pat. No. 8,307,843B2 Page 2, Col 2, Lines 25 and 26 as well as other Publications (for example, A+ Corporation, LLC, "Genie Heated Regulator," Product Bulletin for Model GHR of Genie Heated Regulator, 2005 (2 pages) FIG. 18), or a multistage regulator such as the undersigned applicant's U.S. Pat. Nos. 8,220,479, 8,616, 228, 9,588,024 and GENIE brand JTR (FIG. 22), the contents of which are incorporated herein by reference.

An economic advantage to the power cord in the tube bundle is gained by eliminating the need for the long runs of separate conduit and multiple conduit fittings. Alternatively the heat trace itself in the tube bundle (not a separate power cord in the tube bundle) may be tapped for power for a block heater or the like (see GB2188451A FIG. 3), and/or a heater block can include a thermal interface to derive heat from the heat trace itself.

Another innovation described in the present application relates to a unique, compact pressure reducer component formed for placement in a receiver in the base, body or mounted block thermally engaging a modular conditioning component such as a vaporizer and/or regulator, providing pressure reduction associated with fluid being treated by the modular conditioning component, as a step in the fluid conditioning process. This innovation is designed for BLM compliance since BLM Natural Gas sample streams being analyzed are required not to have the liquid composition excluded. This innovation will take advantage of the enthalpy of vaporization, which is a function of the pressure (not the flow) of the fluid. As the phase change occurs at a pressure cut, a large amount of cooling will take place (many times the JT cooling that takes place when a gas is reduced in pressure).

The modular vaporizer with the pressure cut will use that cooling to keep the incoming sample cool (enhancing the thermal isolation barrier shown in FIG. 12) and isolated from the heat applied to quickly flash vaporize the sample to a single-phase gas sample. The pressure cut ratio is defined by the incoming and outgoing areas of the piston used to make the pressure cut. The ratio is pre-defined to drop the pressure of the liquid that then proceeds to be flash vaporized so that no disassociation takes place, which works in combination with the process that begins with the unique and innovative probe used to extract the sample.

The natural gas sample leaving the vaporizer has an expansion ratio of about 300:1 from its liquid phase and it now continues to the heated regulator with a similar pressure cut piston that is used to divide the gas pressure reduction and spread the JT cooling so that the heater block attached to the regulator can now keep the gas above its condensation temperature. See FIGS. 7D, 7E, 10, and 11. Of course, some improvements are made with each module (probe, bracket housing enclosure system, vaporizer with pressure cut, heated regulator with pressure cut) of this total sampling system and those skilled in the art may utilize any or all modules of this innovative modular solution.

With the above described innovations, the present invention provides a novel and unique modular conditioner/sampling system which, unlike the prior art, is not designed to specifically reject entrained liquids, instead providing vaporization to facilitate a single-phase sample suitable for flowing to an analyzer, utilizing added power provided via the unique tube bundle power configuration. Accordingly, unlike prior art systems, the present system is designed to be fully compliant with BLM order 5 Facility Measurement Points (FMP).

To prevent sample distortion after the probe, a capillary passage with associated higher flow velocity following the linear-slot sampling probe of the present invention is provided, to prevent disassociation of the two-phased sample, and is vaporized by the novel and unique vaporizing with pressure reducing module. Also provided is a unique heated regulator with pressure reducing module. These components are preferably located inside a unique housing/enclosure that facilitates 100% access to all components. The housing/enclosure of the present invention accomplishes the objective of providing full access without the requirement for hinges or diagonal cuts. The system is designed so that the enclosure is independent of the probe and the components. The enclosure can be easily and completely removed without disturbing the probe or any other components of the system, while protecting the components and decreasing heat loss.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 1 is a frontal view of a sample conditioning system comprising modular sampling and/or conditioning components mounted to a substrate bracket, enclosed via a housing/enclosure 10 further showing an end view of the source of gas with entrained liquids, a linear sampling probe of the present invention situated therein, providing a passage to the modular sampling/conditioning components via substrate coupling.

FIG. 2 is a side view of the invention of FIG. 1, with housing/enclosure 10 and substrate coupling 5 shown.

FIG. 7A illustrates a side, partially cut-away, partially cross-sectional view of the probe with slotted probe tip of the present invention having the capillary line through the length of the probe via probe passage, passing through the probe first end, rack, and the second end to probe tip.

FIG. 7B is a side, partial, partially cut-away, detailed view of the first end of the capillary tube engaging a flow component for flow out of the probe, sealed via o-ring.

FIG. 7C is a side, partial, partially cut-away, detailed view of the second end of the capillary tube engaging a flow component for flow out of the probe, sealed via o-ring.

FIG. 8A is a first side, perspective view of a tube bundle configuration with cover and insulation as utilized in the tube bundle interface for the present invention.

FIG. 8B is an end view of the tube bundle configuration with cover and insulation of FIG. 8A.

FIG. 8C is a second side, perspective view of the tube bundle configuration with cover of 8A.

FIG. 9 is a side view of the invention of FIG. 8A illustrating a length of tube bundle showing a terminated end and components including sample tube and power cord.

FIG. 10A is a top view of the heat trace of the present invention with power cord connector, connected to a power cord.

FIG. 12 is the side, partially cross-sectional view of applicant assignee's prior art vaporizer (GENIE brand Vaporizer) that utilizes a controller.

FIG. 14A is a side, cross-sectional, exploded view of the invention of FIG. 13A, further showing the assembly of the heater block, plate, fitting, and rod.

FIG. 14B is a side, exploded view of the invention of FIG. 14A.

FIG. 14C is an frontal, exploded view of the invention of FIG. 14B

FIG. 16A is frontal, cross-sectional view of the invention of FIG. 15, further showing an internal view of the construction of the first embodiment of the present invention.

FIG. 16B is a frontal view of the invention of FIG. 16A.

FIG. 16C is a side view of the invention of FIG. 16B.

FIG. 16D is a side, cross-sectional view of the invention of FIG. 16C.

FIG. 17A is an exploded, partially cut-away, partially cross-sectional, frontal view of the invention of FIG. 15, further showing the assembly of the piston housing and piston forming the pressure reducer component.

FIG. 17B is an exploded, frontal view of the invention of FIG. 17A.

FIG. 17C is a close-up, partial, exploded, frontal view of the piston housing and piston.

FIG. 17F is a side, partially cut-away view of an alternative embodiment to the vaporizer pressure reducing module of 15A, wherein there is provided stacked pressure reducing pistons 126, 126' in an extended pressure reducer component receiver 127' for staged pressure reduction.

FIG. 17G is a side, partially cut-away, partially cross-sectional view of the invention of FIG. 17F.

FIG. 18 is a cross-sectional view of the applicant assignee's prior art GENIE brand Heated Regulator (GHR) with pre and post heat exchange.

FIG. 20A is a side, cross-sectional view of the invention of FIG. 19, further showing an internal view of the construction of the first embodiment of the present invention.

FIG. 20B is a frontal view of the invention of FIG. 20A.

FIG. 20C is a side view of the invention of FIG. 20A.

DETAILED DISCUSSION OF THE INVENTION

Figure 3:
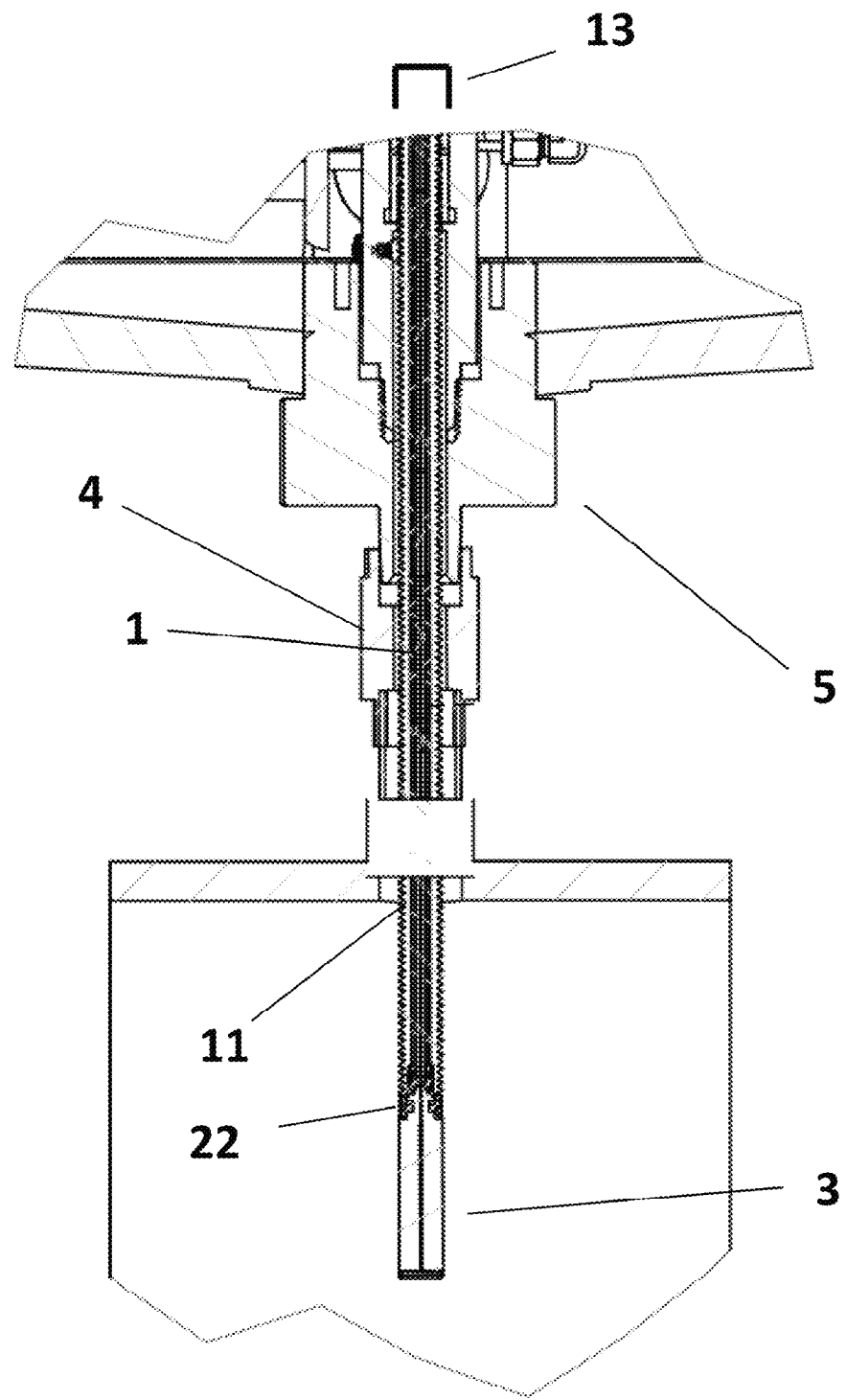
FIG. 3 is a partial, close-up view of the probe, housing/enclosure and substrate of FIG. 2.
Figure 4:
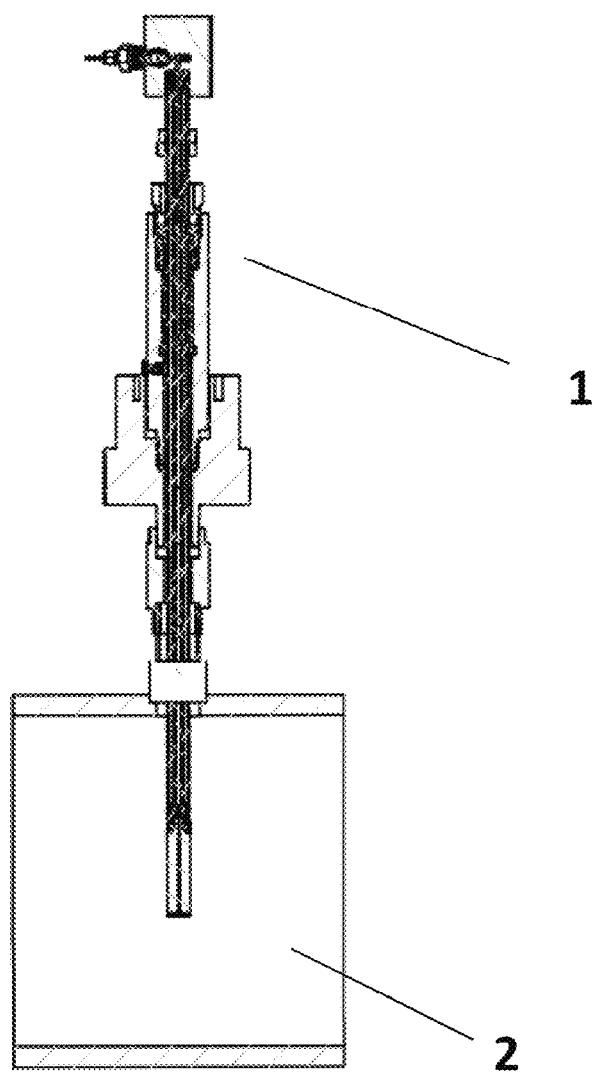
FIG. 4 is a side, sectional, cut-away view showing the insertion mechanism of the present invention supporting the probe tip.
Figure 5A:
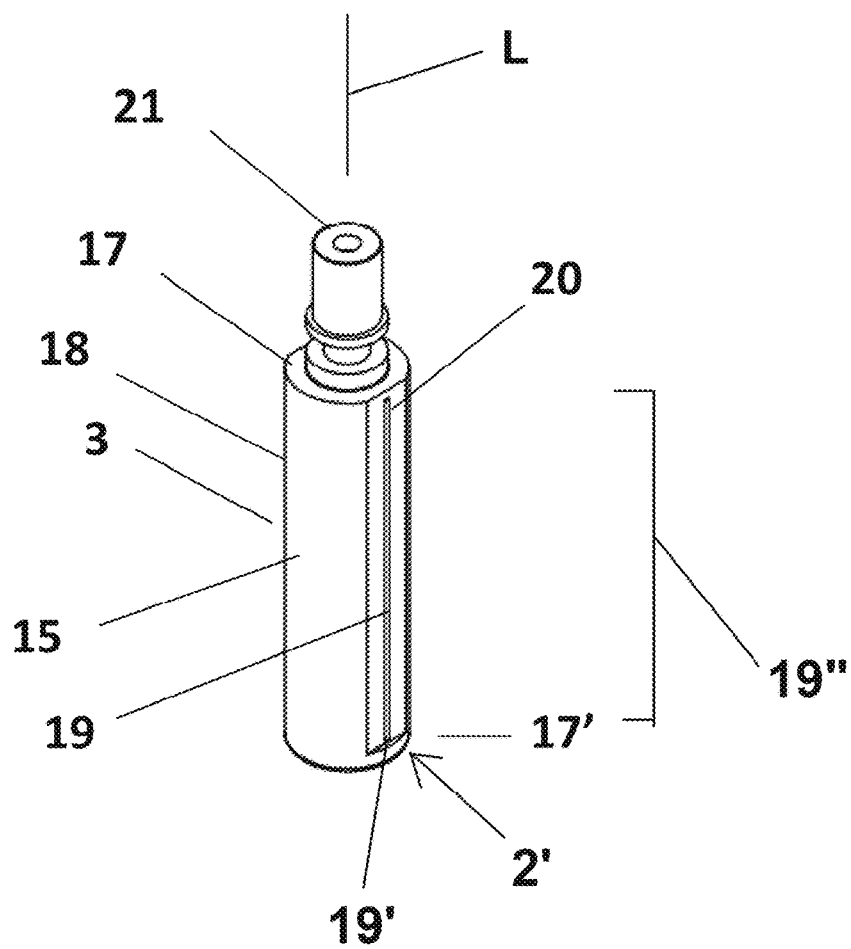
FIG. 5A is an isometric, front view of the probe tip illustrating the linear slot formed along the length of the body, and threaded connection end with outflow passage.
Figure 5B:
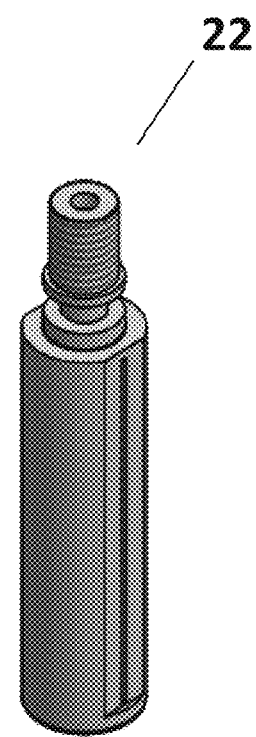
FIG. 5B is a greyscale view of the probe tip of FIG. 5A.

Referring to FIGS. 1-22, the linear sample slotted probe tip 3 of the present invention extracts a representative sample from the pipeline and transports that sample to the unique and innovative modular vaporizing pressure reducing module system of the present invention. The output of the vaporizing pressure reducing modular conditioning system of the present invention is engineered to produce a single phase, gas only output which is transported, preferably, via a heated tube bundle to an analyzer for analysis.

Linear Sample Probe and Method of Sampling

Preferably, the preferred embodiment of the modular sample conditioning system of the present invention is mounted at the source of the sample, in this case a pipeline having pressurized process gas with entrained liquids.

FIGS. 1-4 show the pressurized source of gas (a/k/a process source) with entrained liquids 2 with insertion probe 1 having mounted thereto a linear, sampling probe tip 3 having a slot 19 positioned in the fluid stream 2' (in the present example, gas having entrained liquids 2). In use, the collection slot 19 of probe tip 3 faces the fluid flow 2', the probe tip 3 being positionable within the pipe as desired. In the present example, the probe is positioned in the center-third area to sample the center-third 12 as required in certain BLM locations, to collect from the medial area of the flow stream, although the probe length and associated collection area can be modified as required. A probe isolation valve 4 is provided to selectively open and close the flow to the modular sample conditioning system 6 (shown with enclosure 10), as required.

Referring to FIGS. 1-7C, the body 15 of the linear sampling probe tip 3 has formed therein an elongated, continuous or uninterrupted slot or opening 19 having a length aligned with the longitudinal axis L of the body 15, the slot or opening 19 having a relatively narrow width 19' and length 19" penetrating the outer wall or surface of the body, the slot forming first and second side walls within the body forming an outer edge 20 and an inner edge 20', respectively, corresponding to its depth, and providing a passage to the outflow passage 21 having a small inside diameter.

In the preferred embodiment of the invention shown in the FIGS. 5A-7E, the slot 19 preferably has a relatively uniform width preferably corresponding to, or less than, that of opening, while providing passage to outflow passage 21 communicating with the inner edge 20' of the slot, shown about halfway through body. The slot in the present embodiment as shown is aligned with and runs along a longitudinal axis, although the length and position of the slot can vary depending upon the application.

As shown, the slot 19 in the exemplary, preferred embodiment of the probe tip of the present invention runs from just below the first 17 end of body 15 to about the second end 17' of body 15, with the inner edge 20' of the slot 19 engaging outflow passage 21 having a small inside diameter, as shown, which is formed to engage, as required, insertion probe 1 to provide a channel of flow of fluid therefrom, the outflow passage 21 in the present embodiment preferably having an inner diameter preferably equal to or less than the width of slot.

The present system is formed to collect via the slot in the slotted probe tip a "linear sample" spanning a pre-determined area for sampling of the pipe, in the preferred embodiment of the present invention, the center-third, medial area 12 of the flow as is illustrated in FIG. 1, or (in other versions) alternatively other zones or slot lengths, even the full span of the pipe from side-wall to side-wall, providing a representative sample of the fluid stream wherein a fluid sample of the fluid stream is collected along a line spanning the inner diameter of said pipe, even where there is present entrained liquid particles and even flowing liquid droplets/streams along the lower and/or upper surfaces of the pipe. While the present figures illustrate the position of the probe tip as vertical, this is not intended to be limiting, as the probe can be oriented at any angle relative the pipe, as long as the probe interface (insertion point) allows it.

The slot and outflow passage are preferably relatively narrow (less than $\frac{1}{32}$" depending on the volume of fluid being sample, the speed, viscosity, and other factors) to remove a very thin slice of the total breadth of the fluid stream, so as to provide an accurate composite of the total fluid flow using principals similar to the integral principle as used in calculus.

As described, the body 15 has first 17 and second 17' ends defining a length therebetween, the slot 19 defining a narrow opening to a centrally disposed outflow passage 21 of preferably equal or less diameter than the slot width, thus providing the "integral slice" (in the present example, less than $\frac{1}{32}$" wide slot from the outer surface of the probe) to intersect the small ID outflow passage (less than $\frac{1}{32}$"), so that process fluid having sample gas containing entrained liquid 2 (FIG. 1) passes into the slot 19, passing therethrough to outflow passage 21 to the probe 1, at an equal or higher velocity than the fluid stream, so as to preserve the composition of the fluid stream and prevent disassociation of same.

The threaded end 22 of slotted probe tip 3 threadingly engages the second end of insertion probe 1. Probe 1 has a passage 11 formed therethrough along its length, the probe 1 having an outer diameter 13 formed to allow its length to pass through probe isolation valve 4 (while in an open position) for selective insertion of the probe tip through isolation valve 4, and into the fluid stream.

The probe has formed therethrough along its length probe passage 11 to provide for the passage of fluid from the probe tip 3 there through. In the preferred embodiment of the present invention, a capillary tube 24 (in the present embodiment, formed of stainless steel) is provided having a length and first 25 and second ends 25' and is situated through the length of probe passage 11, the second end 25' of capillary tube 24 formed to engage the outflow passage 21 of probe tip 3 at a receiver 26 (having ID 26') formed within the threaded end 22 of probe tip 3, the first end 25 of capillary tube 24 sealingly engaging the probe tip's outflow passage 21 via o-ring 117'.

The second end 16' of insertion probe 1 engages the probe tip 3 via o-ring providing a sealed connection.

The capillary tube 24 in the present embodiment passes through the length of probe passage 11, the o-ring at first end 25 of capillary tube engaging a flow component 27 (in this case, a 90-degree angle connector), and is sealed via o-ring 117 and positioned to align with a capillary flow passage 119 for flow to the conditioning components downstream, in the present case, the flow would run from capillary tube to vaporizing pressure reducing module (7—FIG. 7D), where any entrained liquid in the flow is vaporized.

The capillary tube 24, like the outflow passage 21 of probe tip 3, has an ID 23' formed to facilitate capillary tube capillary flow properties in the fluid flowing therethrough, which, in the present case, for wet gas (natural gas having entrained liquid) has been found to exist in a passage having an inner diameter of less than $\frac{1}{32}$", although this figure could vary depending upon the surface tension of the liquids and other factors. Further, the geometry of the capillary tube passage facilitates the flow of fluid therethrough at least at the velocity of the fluid stream from which the sample is taken, or at a higher velocity thereto.

In the present exemplary embodiment of the invention, the capillary tube 24 comprises DURSAN brand $\frac{1}{8}$" OD stainless steel tubing, which is situated inside the probe passage (and rack), and the present tubing having a 0.030" or less ID 23' to prevent sample disassociation via capillary action (and maintaining or providing enhanced fluid velocity), the optimal diameter of which can vary significantly depending upon the operational criteria and "wet gas" composition.

In the system of the present invention, it is imperative that no disassociation takes place in the sample fluid flow, from the moment the sampling occurs at the slotted probe tip, through the length of probe 1 (in the preferred embodiment, via capillary tube 24), to vaporizing pressure reducing module 8 inlet 7 (where the sample is conditioned and vaporized).

In the alternative to a separate capillary tube 24, the inner diameter (ID) of probe passage 11 itself could have an ID 116 formed to maintain or increase flow velocity from the probe tip along its length, and accordingly have an ID equal to or less than the width of the opening forming the slot 19 in the slotted probe tip 3 or ID 23 of the outflow passage 21 (i.e., less than $\frac{1}{32}$"), the geometry formed to provide capillary action in the wet gas flowing therethrough to prevent disassociation thereof.

Figure 6A:
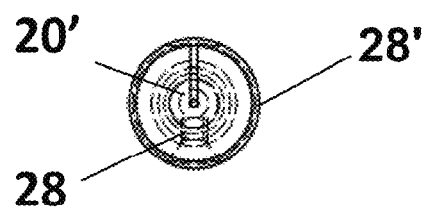
FIG. 6A is a bottom, partially cutaway view of the probe tip.
Figure 6B:
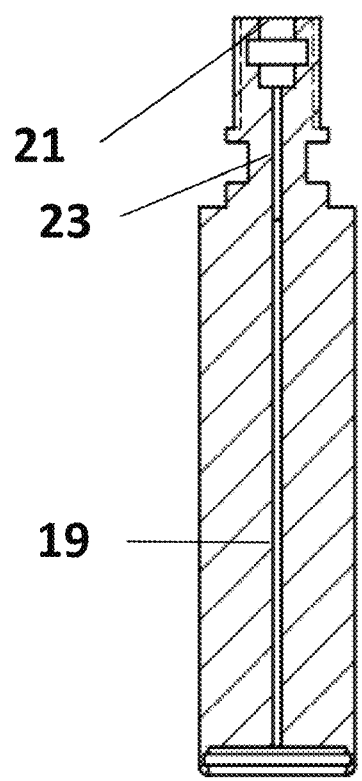
FIG. 6B is a side, partially cut-away, partially cross sectional, detailed view of the probe tip.
Figure 6C:
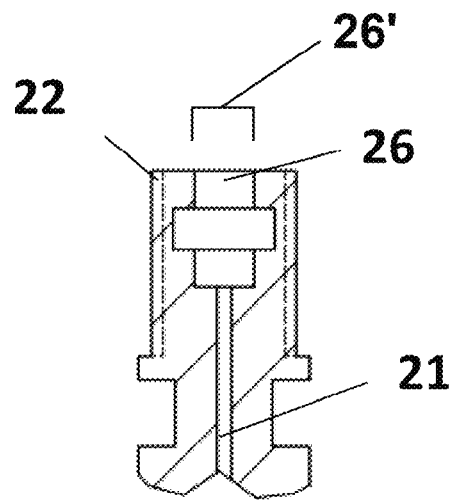
FIG. 6C is a side, partially cut-away, partially cross sectional, detailed view of the threaded end of the probe tip and outflow passage of FIG. 6B.

Continuing with FIGS. 6A-6B, the slotted probe tip 3 of the present invention can include on the back side opposite slot opening 19 threaded apertures 28 formed to threadingly receive screws or other fasteners or the like to facilitate the attachment of a cylindrical solids filter screen 28' (for example, 40×40 mesh, 0.010" wire), to envelope the outer diameter (OD) of the probe tip and prevent solids from entering the opening to slot 19, but large enough for the velocity of the sample, to keep fluids from accumulating.

A bottom screen disc D may also be provided at the second end 17' of slotted probe tip 3 held in place, for example, with a spiral retaining ring D' or the like. In addition to or as an alternative to the filter screen 28', a membrane sleeve may be provided to envelope the probe tip, to prevent the passage of undesired contaminants therethrough. For example, a cylindrical sleeve utilizing the Type 8 membrane provided by A+ Corporation of Gonzales LA could be provided to envelope the length of the probe tip (and even be used in conjunction with filter screen 28'), to exclude liquid non-hydrocarbon contaminant additives such as glycol from passing through, thereby blocking same from entering the probe.

The system of the present invention ensures that the representative sample taken either in spot, batch or continuous fashion is not allowed to disassociate by providing the very small internal cavity forming the outflow passage, to maintain or enhance the fluid flow velocity through the system. The pipeline area is very large compared to the probe's very small interior and because of this vast difference, fluid in the outflow passage from the slotted probe tip to the probe will always be flowing at a higher velocity than the pipeline fluid.

The high gas velocity (higher than the source velocity of the pipeline) of the very small internal cavity/fluid outflow passage is formed to sweep all of the liquid particles at the same velocity as the gas particles being transported from the source to the probe. Therefore, it would remain "associated" with the gas from which it condensed, as verified from Applicant's own empirical testing. High velocity gas in the small internal diameter bore forming outflow passage engaging the relatively narrow slot of the probe will prevent any significant layer of liquid from accumulating on the surfaces. Even if an ultra-thin layer were to coat the probe's interior, the total area is anticipated to be small so that the impact would be expected to be negligible.

Continuing with FIGS. 1-7E, as shown, the slotted probe tip 3 of the preferred embodiment of the present invention is engaged to fluidly communicate with capillary tube 24 (when utilized) at the end of an insertion probe 1, which probe tip 3 then is lowered or inserted I (e.g., via the rack in the preferred embodiment) into a pipeline, as may be required for certain BLM locations, the probe tip 3 positioned in the medial or center-third area 12 of the pipe with the opening forming the entrance of the slot 19 facing the flow stream 2'. While the present illustration shows the sampling position of the probe such that the probe tip 3 is in the center-third area 12 for BLM compliance, it is noted that the probe tip can be positioned elsewhere as required.

A portion of the fluid stream comprising a "linear slice" of the fluid flow in the positioned portion of the pipe then passes into the slot opening, through the slot, utilizing the pressure of the flow stream to facilitate flow through the probe tip outflow passage, as well as the length of the capillary tube engaging the probe tip, so as to provide capillary flow to the modular conditioning components of the present system for heating and/or collection, online analysis, monitoring, or other conditioning or usage. As earlier indicated, in the preferred embodiment, the passages downstream the slot formed in the probe tip preferably have dimensions (i.e., an inner diameter in cylindrical conduits) commensurate with the width of the slot formed in the body forming the slotted probe tip, resulting in an equal or lesser area than the slot, so as to facilitate at least equal but preferably greater fluid velocity flow through said outflow passage (than the fluid stream in the pipe), to keep the fluid from slowing and possibly disassociating.

Along with the higher velocity sweeping the wet gas sample so that it does not disassociate, conventional science recognizes that, as the inside diameter or cross-sectional area of a slot or passage decreases, a static liquid having sufficient surface tension will interact with the walls of sufficiently small slot or passage to trigger static capillary functionality or capillary action, a phenomenon known to occur when the static liquids adhesion to the walls is stronger than the cohesive forces between the liquid's molecules. Such a phenomenon, in combination with the higher velocity sweep, is believed to be an inherently motivating feature in the present invention when wet natural gas passes through the slot or wall when the clearance is at most (depending on various factor) equal or preferably generally less than $\frac{1}{32}$", although the exact threshold where static capillary function can and will occur in this dynamic sweeping combination can vary depending on the composition of the wet gas, as well as other factors.

Figure 7D:
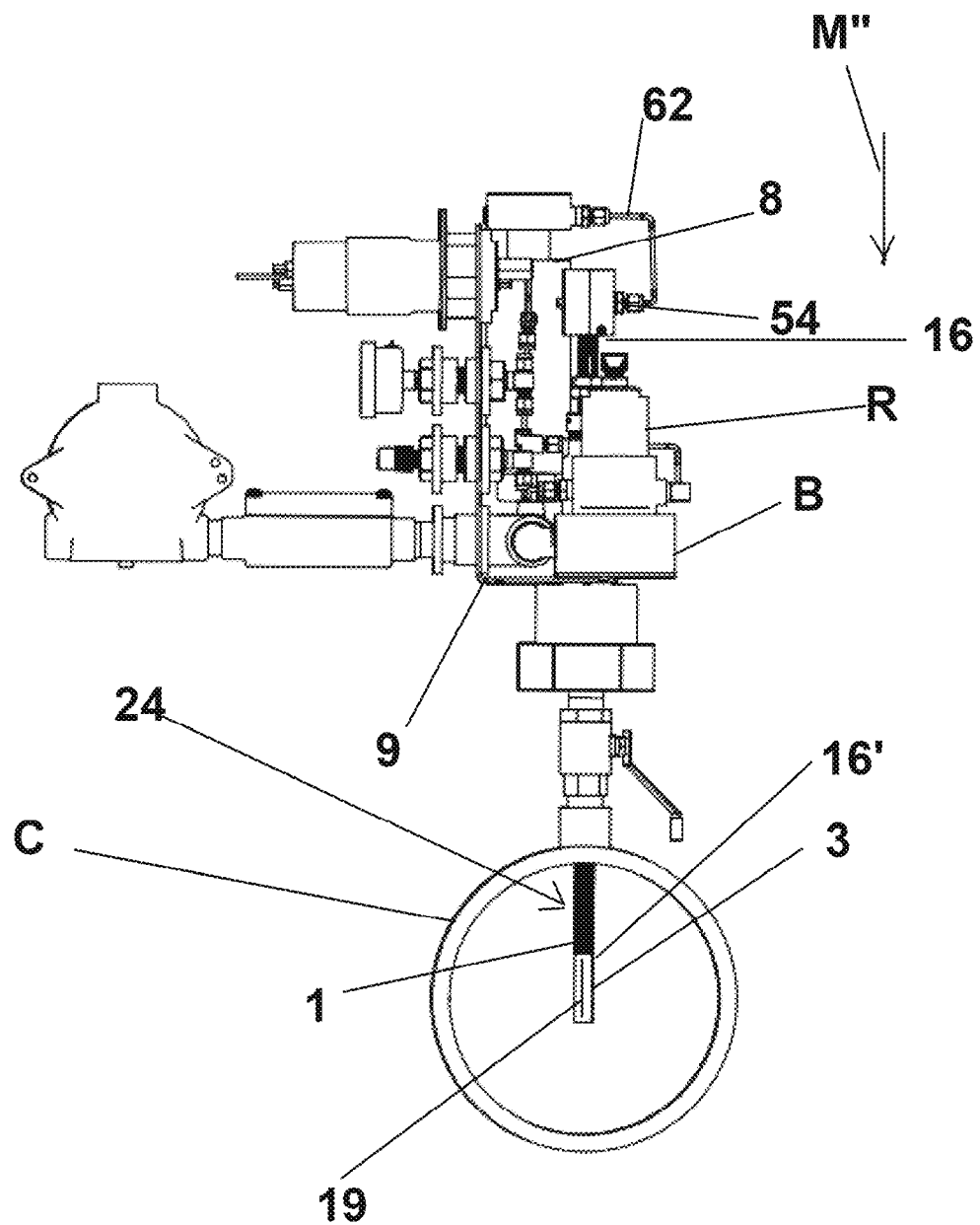
FIG. 7D is a side, partially cut-away view of the probe of the present invention extending into a pipeline, the probe providing selective passage of sample fluid flow to the modular conditioning system of the present invention, the figure further illustrating a vaporizing pressure reducer 8 with controller formed to receive (via inlet 7) fluid flowing from the probe outlet 54, preferably via capillary flow passage 62, followed by a two-stage heated pressure reducing modular regulator R with self-limiting heater block B.
Figure 7E:
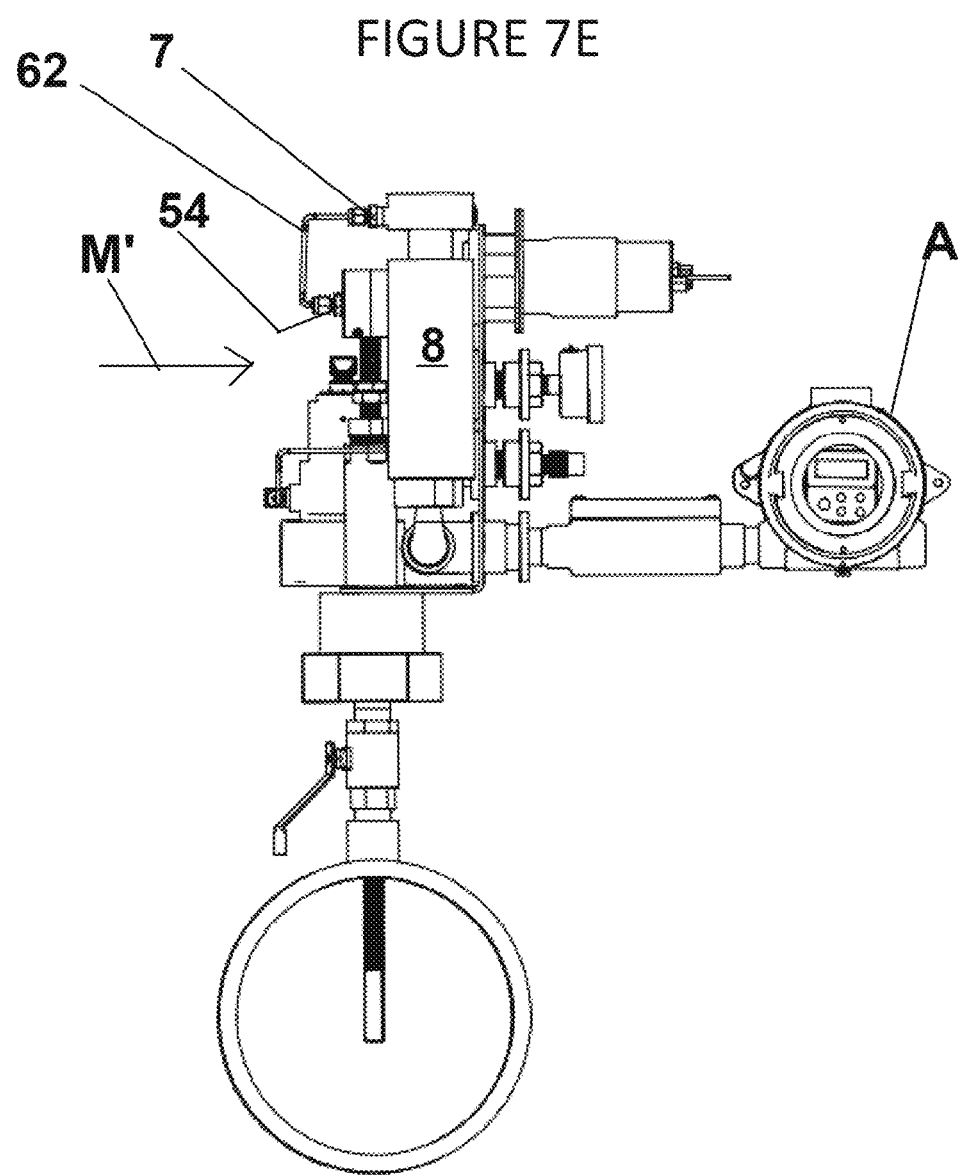
FIG. 7E is a reverse side, partially cut-away view of the present invention of Figure D, illustrating the capillary flow passage 62 running from the probe outlet 54 to the vaporizing pressure reducer 8 inlet 7.

Referring to FIGS. 7D-7E, in the preferred embodiment of the present invention, the sample, after passing through the length of the probe 1 from the second 16' end (preferably via capillary tube 24 situated through the length thereof) to the first 16 end, flows through the probe outlet 54 via capillary flow passage 62 or conduit to vaporizing pressure reducer 8 inlet 7.

The first embodiment of the modular vaporizer of the present invention (FIGS. 15A-17C) incorporates a pressure reducer to facilitate a reduction or cut in pressure (or "pressure cut") in the pressurized fluid flowing therethrough, resulting in a large amount of cooling taking place (many times the JT cooling that takes place when a gas is reduced in pressure). The modular vaporizer with the pressure cut will use that cooling to keep the incoming sample cool at the inlet (enhancing the thermal isolation barrier shown in FIG. 12) and isolated from the heat downstream, to quickly flash vaporize the sample to a single-phase gas sample once it flows through the vaporization chamber in the body of the vaporizer, as further described herein.

The pressure cut ratio of the pressure reducer is defined by the incoming and outgoing areas of the piston used to make the pressure cut. The ratio is pre-defined to drop the pressure of the liquid that then proceeds to be flash vaporized so that no disassociation takes place which works in combination with the process that begins with the unique and innovative probe used to extract the sample. The gas sample leaving the vaporizer has an expansion ratio of about 300:1 from its liquid phase and it now continues to the heated modular regulator R with a similar pressure cut piston (via pressure reducer component) that is used to divide the gas pressure reduction and spread the JT cooling to two stages so that the self-limiting heater block B attached to the regulator can now keep the gas above its condensation temperature. See FIGS. 7D, 7E, 10, and 11. The conditioned gas sample then proceeds to a process analyzer, monitor, sample container, or other end use. Details on the vaporizing pressure reducer 8 as well as the two-stage heated pressure reducing modular regulator R (with self-limiting heater block B) are further provided herein.

Considering the above and foregoing, a method of sampling a wet gas from a fluid stream the present invention could therefore comprise the steps of, for example:

a. providing a probe having a probe passage formed along its length having an inner diameter having a geometry to facilitate capillary action in wet gas flowing therethrough, at a higher velocity than said fluid stream;

b. allowing wet gas to flow from said fluid stream into and through said probe so as to provide capillary action at the higher velocity;

c. allowing said capillary action to prevent disassociation of said composition of said wet gas as it flows through said probe passage.

Still further, the method of sampling a wet gas comprising gas with entrained liquid in a fluid stream having a flow velocity could comprise, for example, the steps of:

a) providing a probe tip 3 engaging a probe 1, said probe tip comprising an elongated slot situated substantially along its length;

b) laterally positioning said probe tip in the fluid stream so that said slot faces the stream;

c) utilizing said slot to receive a linear sample of flow of said stream into said body, providing received flow;

d) flowing said received flow through a passage sized to have capillary flow properties to prevent disassociation; and e) utilizing a vaporizer to vaporize said received flow to provide a representative sample gas; and f) flowing said representative sample gas eto an analyzer In addition, (referring to FIGS. 7D-11, 15A-17, and 19-21, further discussed herein) the present invention contemplates the utilization of a vaporizer having a pressure reducer (aka pressure cut) at its inlet as a modular conditioning component for the present representative sample before analysis where the gas contains entrained liquids, which can comprise the sub-steps in step "(e)" of:

e(1) providing a heated vaporizer having a vaporization chamber, said vaporizer comprising a body having first and second ends, said first end having an inlet formed therein providing passage to a pressure reducer, said pressure reducer situated in a thermal isolation section formed to thermally isolate said pressure reducer from said vaporization chamber, said vaporization chamber formed to receive a reduced pressure flow from said pressure reducer;

e(2). flowing a pressurized gas having entrained liquid into said vaporizer inlet so as to flow to said pressure reducer;

e(3) utilizing said pressure reducer to reduce the pressure of said gas with entrained liquids, providing reduced pressure gas with entrained liquids; while e(4) using said pressure reduction of said entrained gas to expend heat, so as to cool said thermal isolation section, providing a cooled thermal isolation section;

e(5) using said cold thermal isolation section to resist heating by heat from said vaporization chamber of said reduced pressure gas with entrained liquids while flowing through said pressure reducer so as to maintain composition;

e(6) flowing said reduced pressure gas with entrained liquids into said vaporization chamber so as to facilitate flash vaporization of said entrained liquids, providing a representative gas sample without entrained liquids;

e(7) flowing said representative gas sample without entrained liquids to a pressure regulator with pressure reducer, providing a reduced pressure, regulated gas sample; and e(8) flowing said reduced pressure, regulated gas sample to an analyzer.

Still another method of the present invention can be summarized as follows:

i. analyzing the wet gas to provide compositional analysis—analysis can be accomplished via, for example, an analyzer A, which might comprise, for example, a gas chromatograph, mass spectrometer, or other analyzer known and utilized in the industry of the sample;

ii. utilizing said compositional analysis to determine, for example via the Poiseuille Equation or the like, the dimensions required in a passage to facilitate capillary action in the flow of said wet gas therethrough, providing a capillary passage geometry, which in the case of a radial passage might comprise an internal diameter, for example.

iii. providing in a probe and passage connected to said probe having said capillary passage geometry;

iv. inserting said probe into said fluid stream;

v. allowing wet gas to flow from said fluid stream into said probe passage;

vi. utilizing the flow of said wet gas through said capillary passage geometry to facilitate capillary action in said wet gas flowing therethrough;

vii. utilizing said capillary action to prevent disassociation of said composition of said wet gas as it flows therethrough vii. flowing said wet gas through said probe passage to one or more conditioning components and on to an analyzer A, sample collection container, and/or further conditioning.

As discussed, optimally said probe passage has an outflow passage engaging said elongated slot, which outflow passage is sized in relation to said slot so as to facilitate the flow of fluid therethrough at least at the flow velocity of fluid flowing through said slot;

As discussed, to be compliant with present BLM regulations at FMPs, preferably the probe tip 3) would be situated in the center third (medial area) of the flow.

While less than $\frac{1}{32}$" is indicated as an example of the diameter for capillary flow in the present wet gas application, it is reiterated that the optimal specific geometry can vary depending on a number of criteria. A combination of phase diagram data and empirical testing could be used as a guide to determine the optimum capillary diameter/geometry for the particular wet gas composition, taking further into account the particular pipeline/flow property, application, environmental, and other factors.

Tube Bundle and Boot

FIGS. 8A-9 illustrate an exemplary power conductor or cord 34 of the present invention integrated into the tube bundle 29. Companies such as Thermon Manufacturing Company, www.thermon.com, offer custom tubing bundle options for their products, which might include non-heated auxiliary conductors within tube bundle, as denoted in their Application Flyer PAF0027-0714 (form PAF0027-0714).

As shown, the tube bundle 29 is protected along its length via cover 30, and having insulation 31 therethrough to isolate the components as desired. Situated along the length of the present illustrated tube bundle 29 is sample tube 32 for conveying sample fluid from the modular sample conditioning system to, for example, an analyzer, or sample container, monitor, or other destination, the sample tube 32 in the present preferred embodiment comprising a $\frac{1}{8}$" OD Stainless Steel tube 32 that is heated along its length by an adjacent heat trace 33, along the length of the tube bundle 29, the heat trace 33 terminating at the end of tube bundle.

In the present invention, a separate dedicated power cord 34 of adequate gauge to convey the total required power to the unique sample conditioning system or other apparatus (for the length required) is provided in the tube bundle 29. Alternatively, as in a second embodiment, when the modules are heated by self-limiting heater blocks, power can be supplied from the existing heat trace via a heat trace electrical connector or the like. See Tyco Electronics Raychem GB2199451A, A+ U.S. Pat. No. 6,357,304, Hess U.S. Pat. Nos. 4,307,264A and 4,821,905 and Thompson U.S. Pat. No. 7,162,933.

The length of tube bundle 29 can vary depending on the power source location and the sample system location. Rather than using power from the heat trace, which normally would provide inadequate power for vaporizers or the like, the first embodiment of the present invention provides the separate power conductor or cord 34 in the tube bundle for utilization as the power source. The power cord 34 may bring, for example electrical power in the form of, 110V AC or 24V DC to the modular sample system utilizing the tube bundle, and again, its gauge may vary depending on its length and power requirements of the system.

Figure 10:
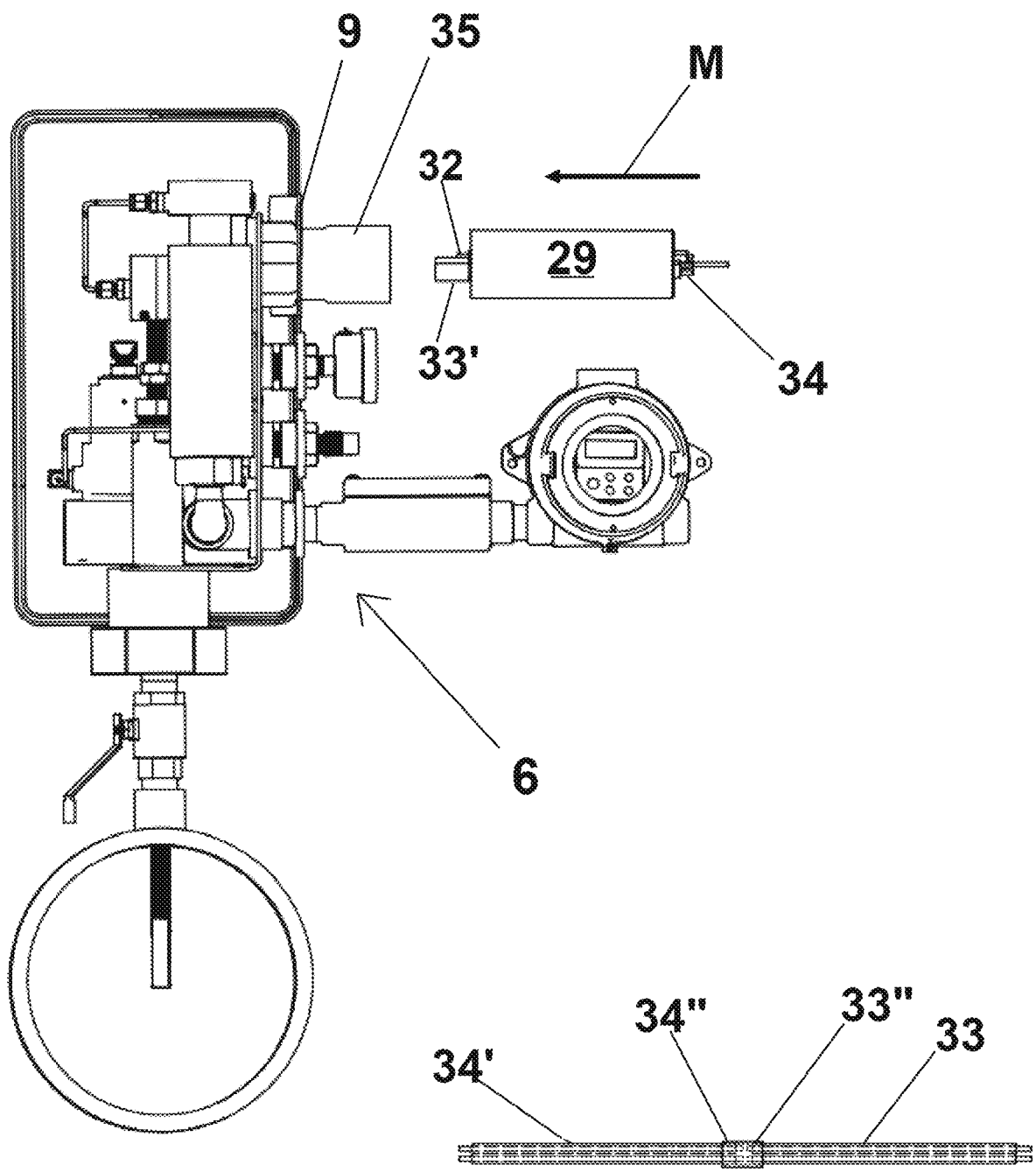
FIG. 10 is a side view further illustrating the insertion of the first end of tube bundle into tube bundle boot of the modular sample system.
Figure 11:
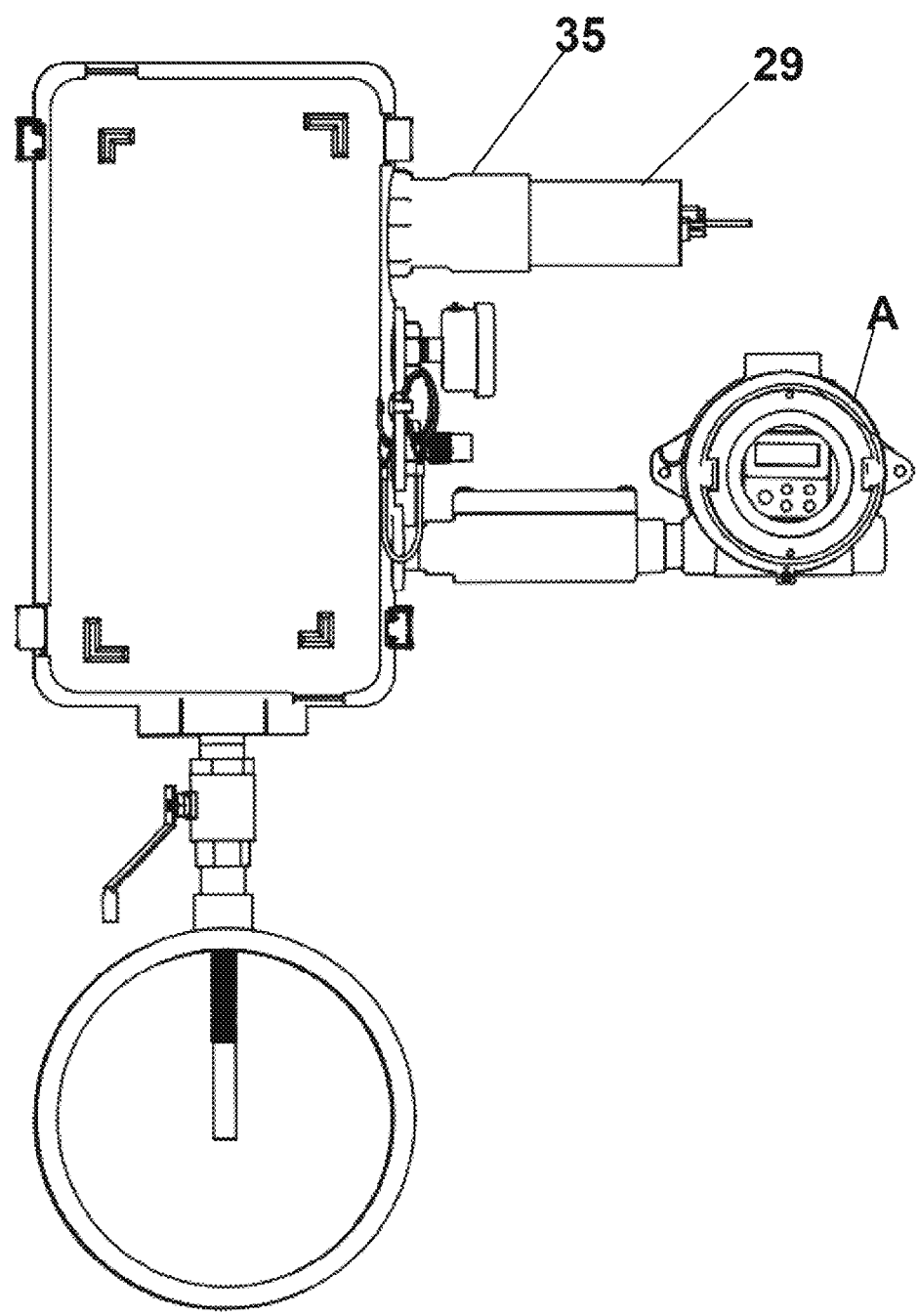
FIG. 11 is a side view of the modular sample system illustrating the first end of the tube bundle fully inserted and swaged in the tube bundle boot, with the power cord engaging the power cord receiver, and outlet tubing engaging the outlet tubing connection.

FIGS. 10-11 illustrate a tube bundle boot 35 mounted M to the bracket 9 of a modular sample conditioning system 6, the tube bundle boot 35 formed to receive the end of tube bundle 29. In addition, the tube bundle boot 35 is formed to engage power cord 34 (for example via plug in boot with power line emanating therefrom) to facilitate the powering of the modular sample conditioning system 6, or alternatively, the boot 36 could feature a pass-through to allow the power cord to pass through the boot to power desired component(s) in modular sample conditioning system 6.

The sample tube 32 in tube bundle 29 is formed to extend therefrom and pass through tube bundle boot 35 so as to engage in sealed fashion and connect to, for example, the outlet port 89 (FIG. 14A) or 115 (FIG. 16D) of a vaporizer. Alternatively, sample tube 32 can engage a receiver in the tube bundle boot 35 to a conduit emanating from the tube bundle boot to the desired conditioning component(s).

Vaporizing Pressure Reducing Module

In the preferred embodiment of the invention shown in the FIGS. 7D-11, 15A-17, and 19-21, a vaporizing pressure reducing module 8 and two-stage heated pressure reducing modular regulator R with self-limiting heater block is mounted M', M", respectively to the modular sample conditioning system 6, so that the vaporizer receives a representative sample from the linear sample probe via slotted probe tip 3 or the like, and the regulator receives the vaporized gas flowing from the vaporizer.

Continuing with the figures, an existing vaporizing pressure reducing modular sample system can comprise, for example, the GENIE brand Vaporizer (GV) (FIG. 12) providing output flow to a GENIE brand Heated Regulator (GHR) (FIG. 18), mounted and configured so as to provide a new and unique modular vaporizer system, as further discussed herein.

FIGS. 15A-17C represent the first embodiment of a vaporizer representing a new, useful and innovative improvement to the prior art. The present innovation has some similarities to the applicant's prior art vaporizer (FIG. 12), but with important differences, including modifying the length of the body 96 by shortening same, while elongating the thermal isolation section 120, to make room to integrate an added pressure reduction capability into the present invention, while thermally isolating the thermal isolation section 120 and pressure reducer situated therein, as well as other differences in the build, operation, and features as will be further discussed herein.

Like applicants' prior art vaporizer (FIG. 12), the improved vaporizer 95 of the present invention comprises a body 96 having a length 97 and first 98 and second 98' ends, said body having a receiver 99 (showed formed longitudinally therein, but whose position can vary), said receiver 99 formed to receive, via opening 102 at the first 98 end of the body, a heater receptacle 101. The heater receptacle 101 comprises a threaded base 103 having a heater receptacle formed to receive a thermal conductor sleeve 105 (a brass sleeve 105 is used in the present example, formed to contain therein a heater core 104 (for example, an electric resistor heating element).

A mesh 107 formed of thermal conducting material (for example, a Stainless Steel 60 Mesh Screen roll formed to fill the gap between the outside diameter of the heater receptacle and the body inside diameter) can be provided in the clearance between the OD 108 of the thermal conductor sleeve 105 enveloping the heater core 106 and the ID 109 of the heater receptacle 104, to facilitate enhanced heat transfer to fluid 110 flowing 111 therethrough/therebetween.

A fluid inlet 112 and/or bypass 112' is provided at about the first end 98 of the body 96 of the present vaporizer 95 to receive a flow of fluid 110 from the probe and direct same to the receiver heater receptacle 104 and flow 111 via the clearance 114 between the thermal conductor sleeve 105 and the inner wall or ID 109 of the heater receptacle 104 (and through the thermal conducting mesh 107, when used) utilizing heat provided to the thermal conductor sleeve 105 via the heater core 106, to facilitate heat transfer to the fluid flowing through the passage forming the vaporization chamber 113, which is situated between the OD of the thermal conductor sleeve 104 and ID of the heater receptacle 104 which heats the vaporization chamber 113 such that fluid flowing therethrough is heated to facilitate the vaporization of any liquids entrained therein to gas, which gas flows out 118 at gas outlet port 115 in the vicinity of the second end 98' of the body 96.

An important improvement in the vaporizer of the present invention over the prior art is the inclusion of a new and innovative pressure reduction or pressure cut capability built-in to the system, which provides not only a reduction in pressure of the incoming fluid prior to vaporization, but is configured to utilize the cooling associated with pressure reduction prevent heating of the fluid sample prior to vaporization, to facilitate enhanced vaporization of entrained liquids flowing therethrough to gas with nominal compositional degradation.

As shown in FIGS. 15A-17C, when compared to the applicant's prior art, GENIE brand vaporizer product (distributed by A+ Manufacturing Inc and shown in FIG. 12), the vaporizing area for the present device has a comparatively shortened length 97, while the thermal isolation section 120 of the present device is elongated 120' to make room for a receiver for receiving a readily-changeable pressure reducing component 124, shown accessible via fluid inlet port 112, as well as providing enhanced thermal isolation, as will be further discussed below, so as to provide distinct "cold" and "hot zones" to minimize any change as to the composition of the fluid components during pressure reduction and vaporization.

As shown, the elongated length 120' (when compared to thermal isolation section in Applicant's prior art vaporizer of FIG. 12) of thermal isolation section 121 increases the space 122 forming the thermal isolation barrier between the thermal isolation section 120 and the first end 98 of body 96, providing a neck 123 having a receiver 127 formed therein to better thermally isolate the thermal isolation section 121 from the heated body of the vaporizer as well as provide space to receive a pressure reducer apparatus in the form of a drop-in modular pressure reducing component 124 comprising a piston housing 125 which is formed to receive pressure reducing piston 126 provided to reduce the pressure of wet gas flowing therethrough, providing a pressure cut of the fluid flowing into the vaporizer to facilitate the flash vaporization thereof, providing vaporized gas, which can then be further conditioned downstream, i.e., flowing to pressure regulator (such as an adjustable regulator) as further discussed herein.

The pressure reduction piston 126 of the pressure reducing component of the present invention is sized to provide a fixed pressure reduction, based on its diameter dimensions, and as such can be changed by varying the size of the piston 126. The pressure reducing apparatus 124 comprises, a piston housing 125 and piston 126 with customizable diameters that configure to provide the desired pressure cut ratio, 125 piston housing can vary to change inside dimensions to match the piston with piston housing plug or receiver 127.

Use of the pressure reducing component results in a pressure drop or pressure cut of the fluid flowing therethrough, resulting in a large amount of cooling taking place (many times the JT cooling that takes place when a gas is reduced in pressure). The thermal isolation section 120 is thereby cooled (in effect providing an area of reduced temperature, in effect a "cool zone" along the length 120' of the thermal isolation section 121, which is used to thermally isolate the inflowing fluid and prevent heating of the sample fluid entering inlet 112 from the vaporization area downstream, utilizing the space created by thermal isolation barrier 122 to thermally isolate while exploiting the cooling associated with the operation of the pressure reducer, so as to provide a cooled, pressure reduced gas flowing into the vaporization, facilitating a clean quick flash vaporization of the sample to a single-phase gas sample without compositional degradation upon flowing into the vaporization chamber 113 in the heated body of the vaporizer, as previously described.

The pressure cut ratio of the pressure reducer is defined by the incoming and outgoing areas of the piston(s) used to make the pressure cut. The ratio is pre-defined to drop the pressure of the liquid that then proceeds to be flash vaporized so that no disassociation takes place which works in combination with the process that begins with the unique and innovative probe used to extract the sample. The gas sample leaving the vaporizer has an expansion ratio of about 300:1 from its liquid phase and it now continues to the heated modular regulator R with a similar pressure cut piston that is used to divide the gas pressure reduction and spread the JT cooling to two stages so that the self-limiting heater block B attached to the regulator can now keep the gas above its condensation temperature. See FIGS. 7D, 7E, 10, and 11.

A further advantage of the present "drop-in" modular component feature is that it allows ready customization of the desired pressure drop to facilitate the desired vaporization or other conditioning required, by choosing the appropriate specification pressure reducer component 124 apparatus, which can offer different pressure reduction characteristics while maintaining similar exterior dimensions/configuration. bit with different pressure reduction characteristics, allowing the user to choose the desired pressure reduction characteristic for the particular installation, and insert 128 or "drop in" the appropriate pressure reducer component 124 into the pressure reduction component receiver 127 of the unit.

Figure 17D:
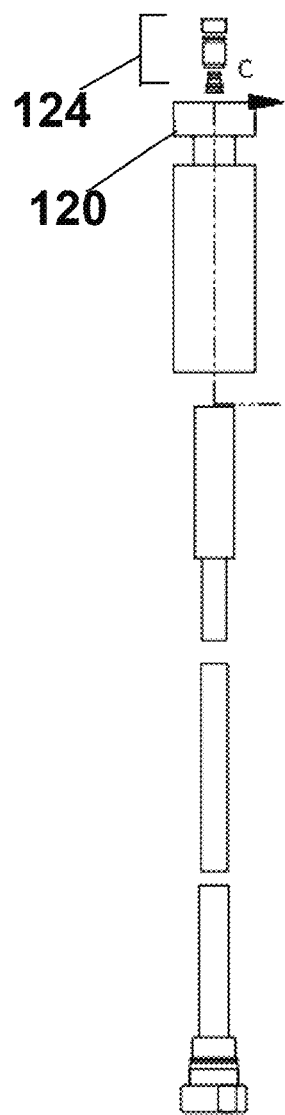
FIG. 17D is an exploded, side view of the invention of FIG. 17B.
Figure 17E:
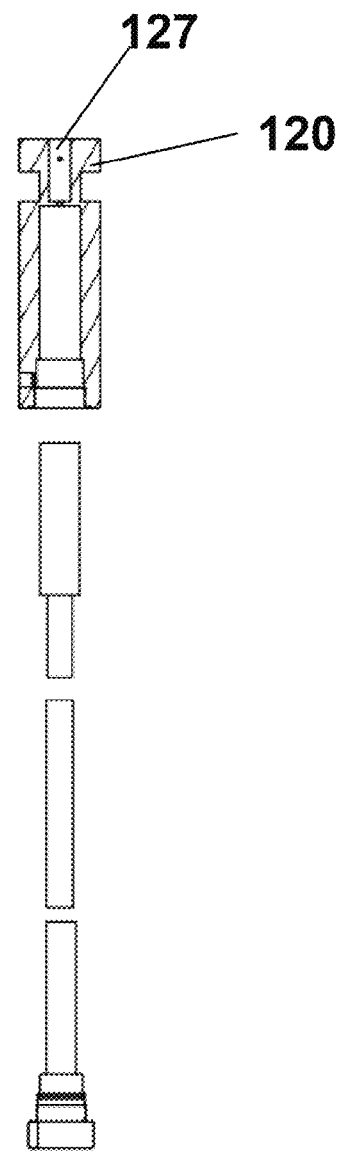
FIG. 17E is an exploded, side view of the invention of FIG. 17D, but without the piston and associated components.
Figure 19:
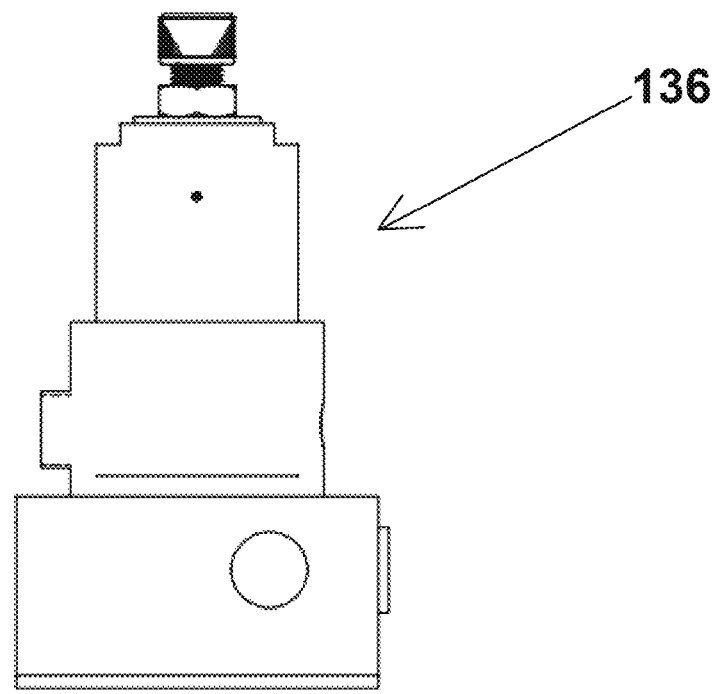
FIG. 19 is a side view of the first embodiment two-stage heated pressure reducing modular regulator with self-limiting heater block.
Figure 21A:
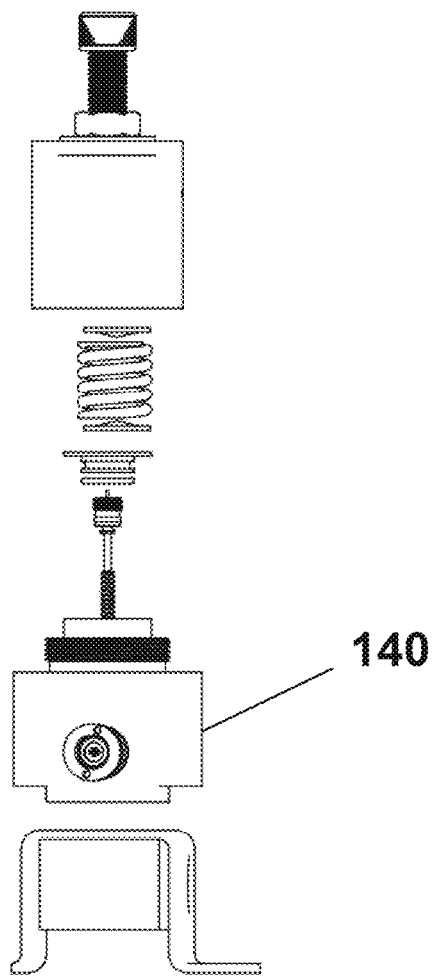
FIG. 21A is an exploded, frontal view of the invention of FIG. 19, further showing the assembly of the piston housing and piston.
Figure 21B:
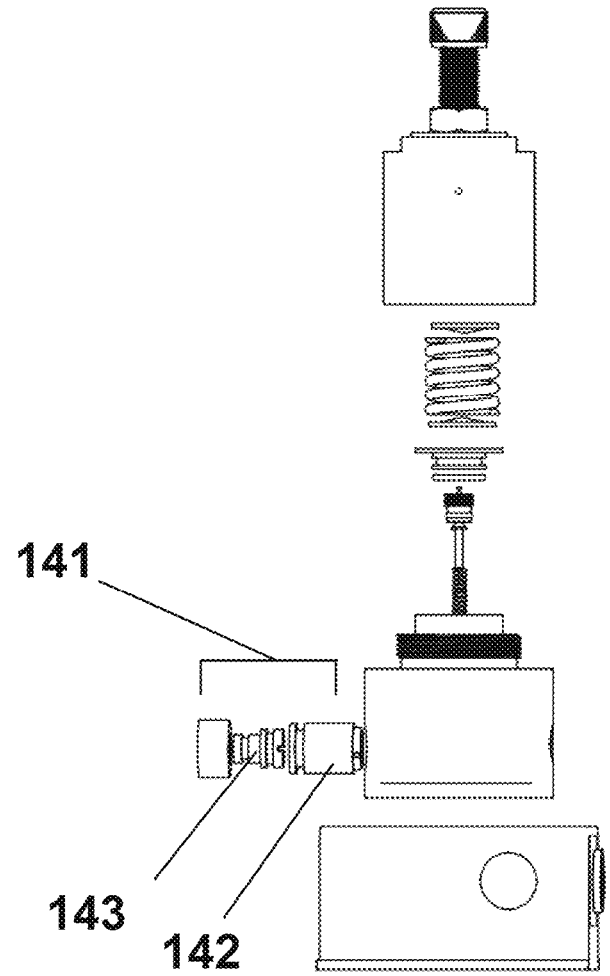
FIG. 21B is an exploded, side view of the invention of FIG. 21A.
Figure 21C:
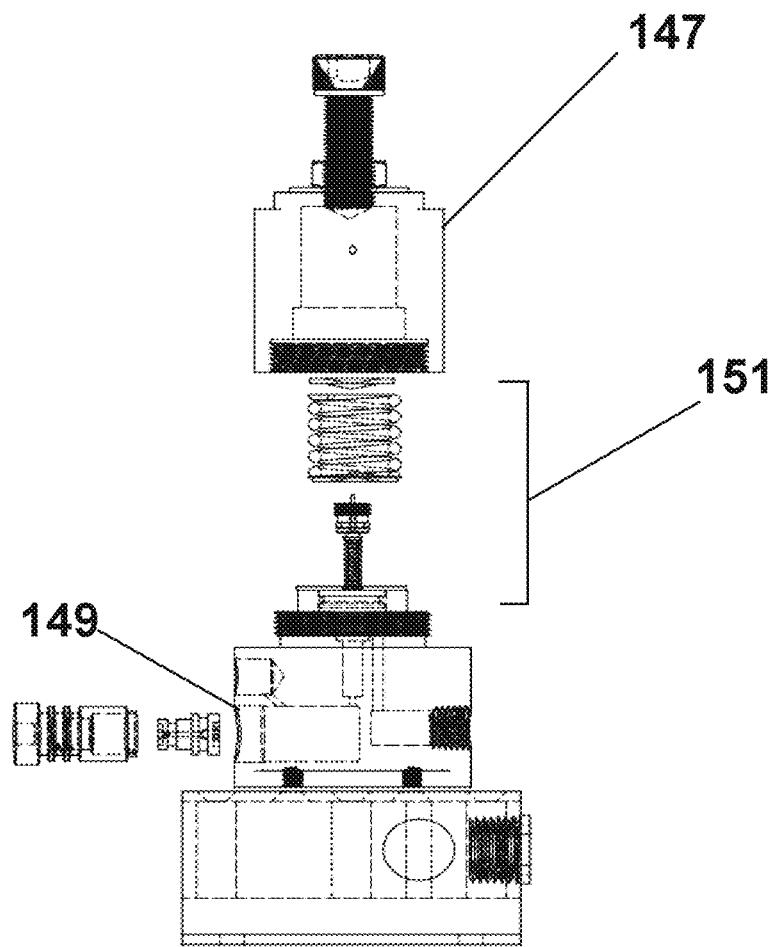
FIG. 21C is an exploded, side, partially cut-away view of the invention of FIG. 21B, showing passages and/or features provided therein in phantom.
Figure 21D:
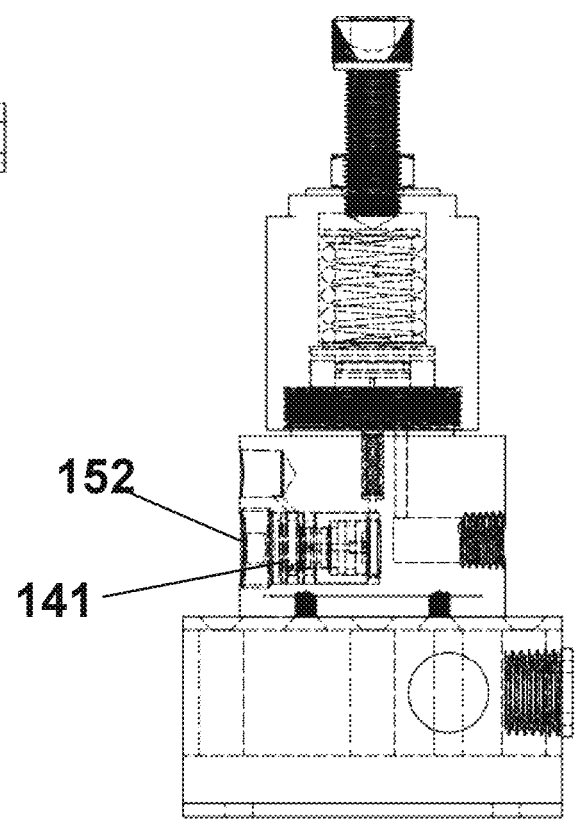
FIG. 21D is an assembled, side, partially cut-away view of the invention of FIG. 21C, showing passages and/or features provided therein in phantom.
Figure 21E:
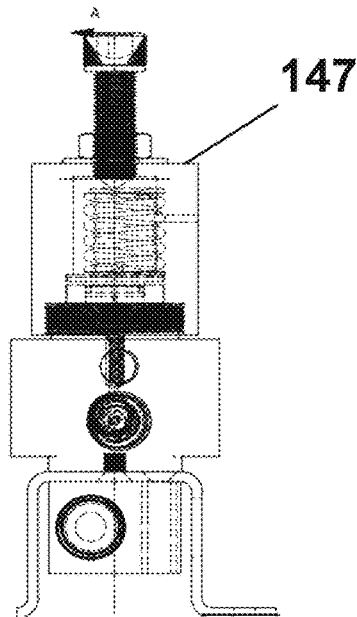
FIG. 21E is an assembled, partially cut-away, frontal view of the invention of FIG. 21A, showing passages and/or features provided therein in phantom.
Figure 21F:
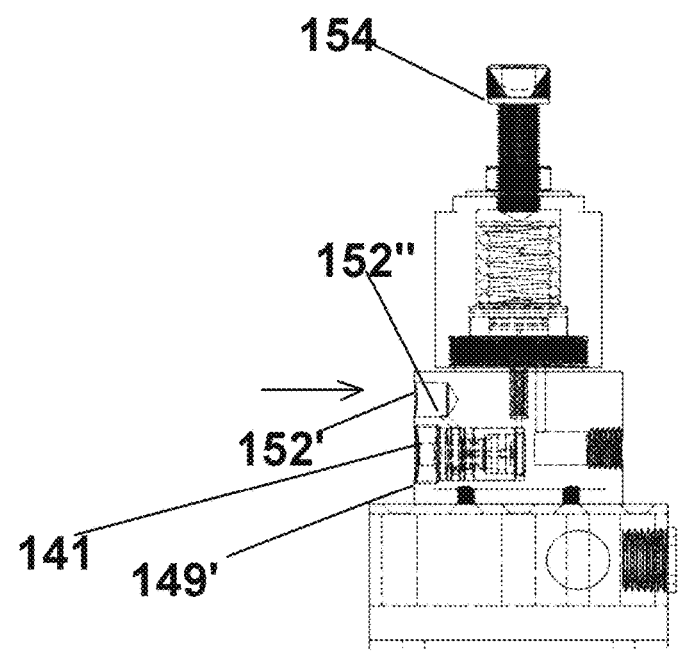
FIG. 21F is a side, partially cut-away view of the invention of FIG. 21E, showing passages and/or features provided therein in phantom.
Figure 21G:
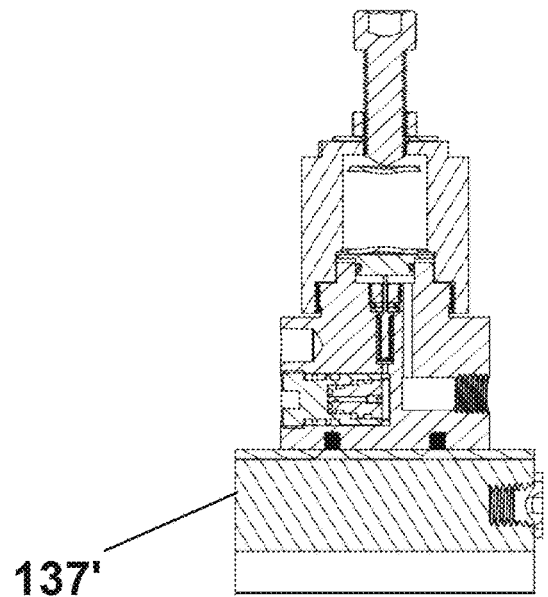
FIG. 21G is a side, partially cross-sectional, partially cut-away of the invention of FIG. 21F (but without some of the regulator components shown).
Figure 22:
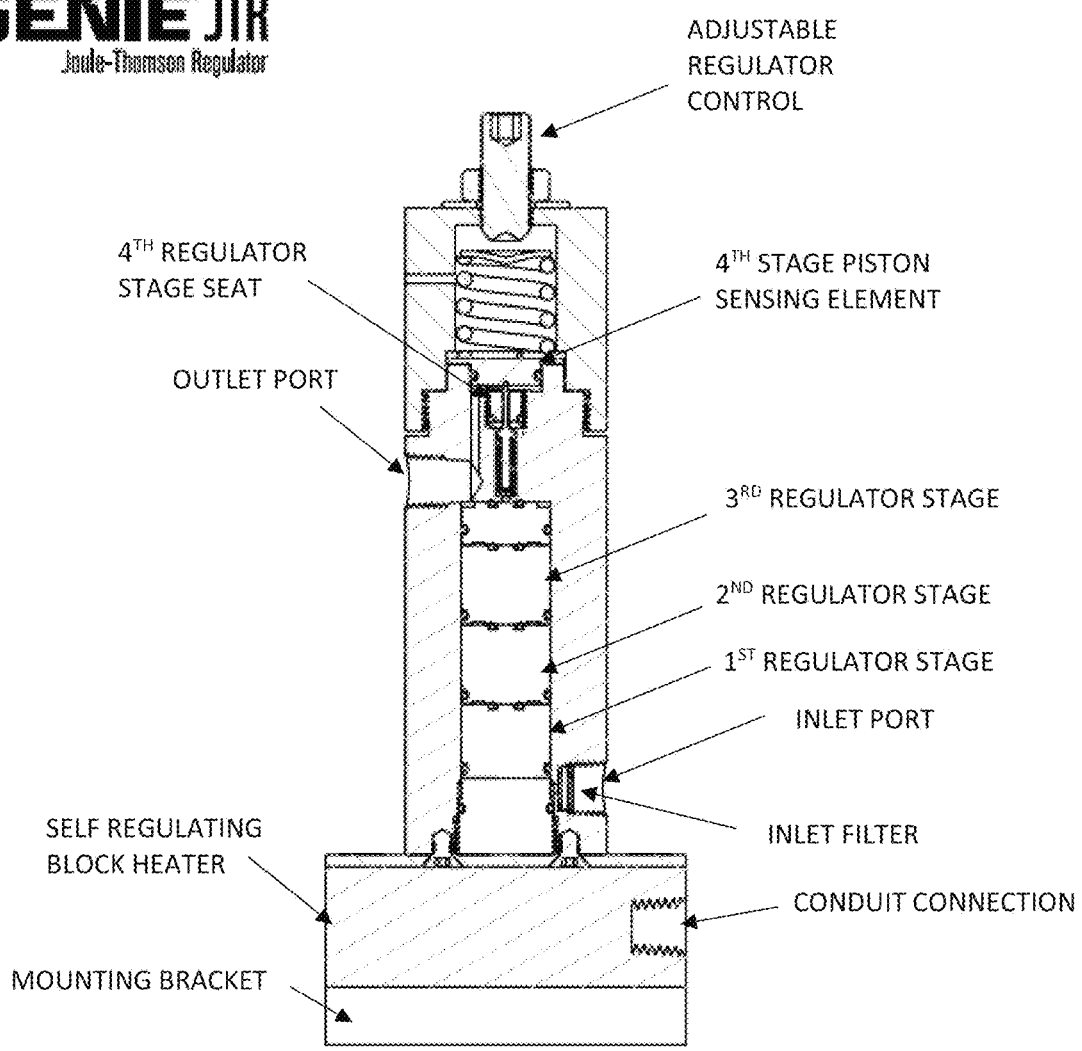
FIG. 22 is a side, partially cross-sectional view of the applicant assignee's prior art GENIE brand JTR multi-stage Heated Regulator, described in U.S. Pat. Nos. 8,220,479, 8,616,228, and 9,588,024, the contents of which are incorporated herein by reference thereto.

Further, the present system can be configured to provide not only a first pressure reducing stage (as in pressure reduction piston 126 in FIG. 16A, for example), but an alternative embodiment can provide for the utilization of an additional, i.e., second 126', or even more pressure reduction stages in serial flow in an extended pressure reducer component receiver 127', as shown in FIGS. 17F and 17G, which could be could be "stacked" in the pressure reducer component receiver (which likely would require modification of the vaporizer to have a more elongated receiver section to accommodate stacked units as shown in applicant's Genie JTR Regulator FIG. 22 and Applicant's (via assignment) U.S. Pat. No. 8,220,479 issued Jul. 17, 2012, U.S. Pat. No. 8,616,228 issued Dec. 31, 2013, and U.S. Pat. No. 9,588,024, issued Mar. 7, 2017, the contents of which are incorporated herein by reference thereto) to provide staged pressure reduction and lessen the likelihood of Joule-Thomson (JT) effect cooling.

In addition to providing the above identified device as a product, the innovations of the present system can be utilized to modify existing GV, GENIE brand Vaporizer (including the product illustrated in FIG. 12) products to provide integrated pressure reduction capability, by providing a replacement body with reconfigured thermal isolation section to provide piston receiver and pressure reduction piston/mechanism to provide a new module that not only vaporizes natural gas liquids but now makes a predetermined pressure cut (which can easily be changed by swapping out the pressure reduction piston/mechanism, or staged by stacking components in the receiver). The pressure cut or reduction can be changed by varying the dimension of the piston and piston housing diameter within the pressure reducer component 124, while maintaining the same external dimensions to fit in to pressure reduction component receiver 127.

Similarly, other components, such as the GENIE brand JTR (FIG. 22), can be combined with the vaporizing pressure reducing module described above to provide vaporizer functionality (and be stacked if required to avoid JT effect cooling) in sample natural gas liquids, so as to deliver a vapor only sample to a gas analyzer or the like.

Low Power Vaporizer Utilizing Heat Trace-Supplied Heat

FIGS. 13A-14C illustrate an alternative embodiment vaporizer, providing a second, new, innovative redesign of the prior art (applicant assignee) vaporizer of FIG. 12, wherein the electric heater and controller are replaced by a thermal conductor rod (in the present example, brass), fitting, plate and self-limiting heater block formed to thermally engage and conduct heat. This embodiment provides a novel and useful vaporizer having in an alternative version a low power option that can be powered utilizing an existing heat trace (such as the heat trace 33, via the tube bundle boot 35 illustrated in FIGS. 8A-11).

Continuing with FIGS. 13A-14C, the exemplary second embodiment of the vaporizer 70 of the present invention comprises a cylindrical body 71 having a length 72 and first 73 and second 73' ends, said body 71 formed of a thermal conductive material such as brass. The body 71 has partially formed longitudinally 74 therethrough a receiver 75 having an ID 76, for example 1.250 inches, for receiving a thermal conducting mass 77, in the present example, a brass rod 77', formed to be situated within said receiver 75 and having a length 78 to emanate from the first end 73 of body 71 to thermally engage a self-limiting heater block 81 of thermally conducting material via fitting 79 (formed to engage threaded area 82) and mounting plate 80 (which may be threaded as well), respectively, said thermal conducting mass 77 having an exemplary configuration in the form of a cylinder having a length 78 of 0.9 inches and OD 78' of 0.750 inches.

The present vaporizer preferably utilizes a self-limiting heater block 81 such as the SL Blocktherm C brand Self- Limiting Block Heater by Intertec Hess, www.intertec.info, www.intertec.info/documents/ca/hd662ca.pdf, including an electrical connector 83 (which is shown threaded) to receive (via insertion 91) a power cord extension 90 from the tube bundle boot 35, to supply power from the tube bundle 35 engaged thereto (tube bundle 29, and tube bundle boot 35 are shown in FIGS. 8A-9.

A mesh 84 formed of thermal conducting material (Stainless Steel 60 Mesh Screen roll formed to fill the gap between the outside diameter of the heater receptacle and the body inside diameter) may be provided in the clearance between the OD 78' of the thermal conducting mass 77 and the ID 76 of the receiver 75 to facilitate enhanced heat transfer to fluid 85 flowing therethrough/therebetween.

A fluid inlet port 86 is provided at the thermal isolation section 92 associated with the second end 73 of the body 71 of vaporizer 70, inlet port 86 formed to receive a flow of fluid 85 from the probe 3 (preferably via capillary flow tube to prevent disassociation of the fluid components) and direct same to flow 87 via the clearance 88 between the thermal mass 77 and the inner wall or ID 76 of the receiver (and through thermal conducting mesh 84 when provided), providing the vaporization chamber which utilizes heat from the thermal conducing mass 77 and provided by the heater block, to facilitate heat transfer to the fluid flowing therethrough, vaporizing entrained liquids therein to gas, which gaseous fluids flow out at gas outlet port 89 in the vicinity of the first end of the body.

The present, second embodiment of the vaporizer can include additional features, including the pressure reduction feature as disclosed in the first embodiment of FIGS. 15A-17C, wherein the thermal isolation section 92 is modified to include a pressure reduction capability, where a pressure cut is desired.

As shown in FIGS. 5A-7C, the slotted probe tip 3 has an outflow passage with a small inside diameter 21', for example, equal to or less than 1/32". Small diameter capillary tubing 24 provides a capillary flow passage 24' from the outlet of the linear probe to, for example, vaporizing pressure reducing module 8 inlet 7 (FIG. 7E), the first modular sample conditioning component in the modular sample conditioning system of the present invention, where the sample is vaporized then reduced in pressure for further conditioning.

Likewise, applicant assignee's prior art GENIE brand Vaporizer (FIG. 12) can be modified to allow use in remote areas without sufficient AC power availability by removing the GV electric heater and controller and replacing same with a low voltage, self-limiting heater block, plate, fitting and thermal conductor (e.g., brass rod), respectively, as described herein, so as to provide a low power and lower cost vaporizing module.

Figure 11A:
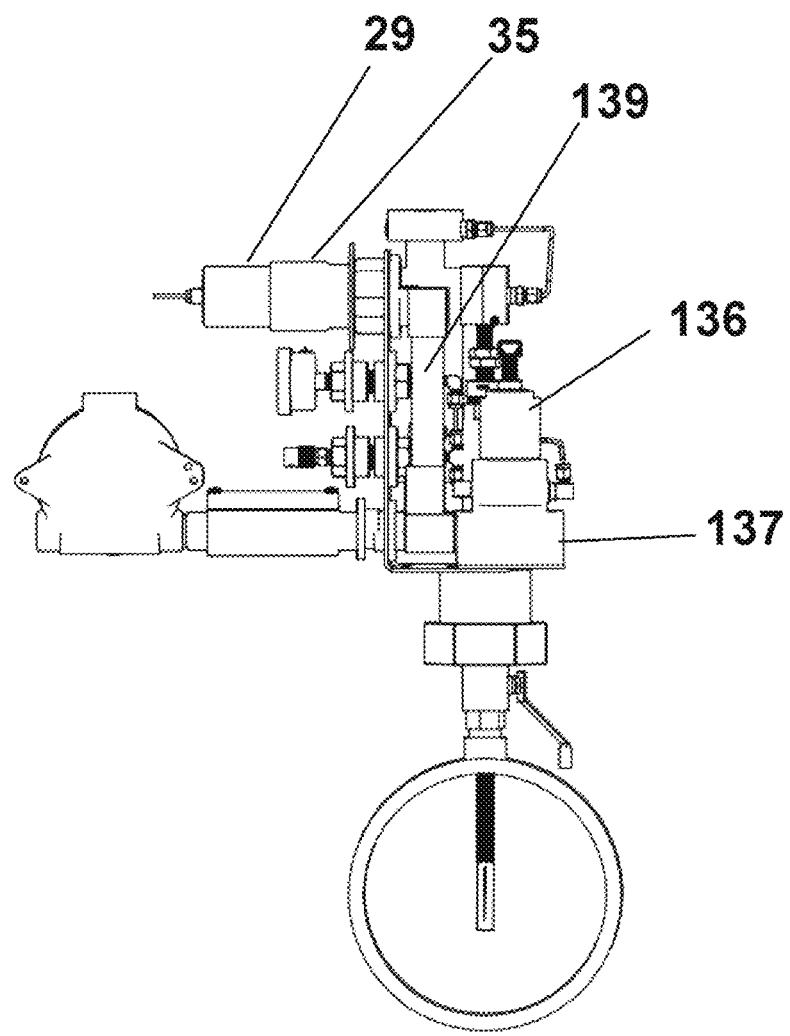
FIG. 11A is a side view of the invention of FIG. 11.
Figure 13A:
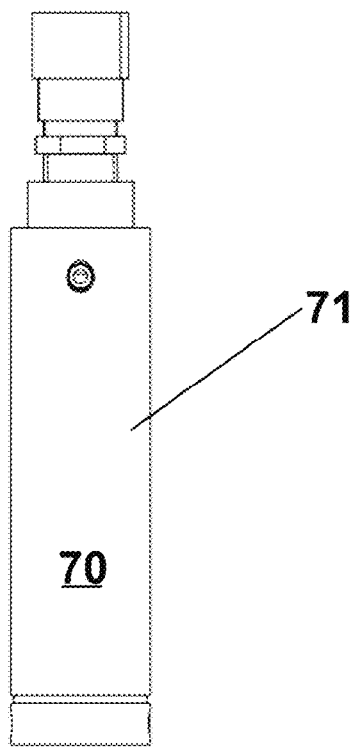
FIG. 13A is a side view of a second alternative to the vaporizer of FIG. 12, comprising a vaporizer module without the heater cartridge, controller and feedback of the vaporizer of FIG. 12, instead utilizing a brass rod, fitting, and plate that attaches to a self-regulating heater block, providing a more economical unit which justifies the additional expense of the two-stage heated pressure reducing modular regulator with self-limiting heater block.
Figure 13B:
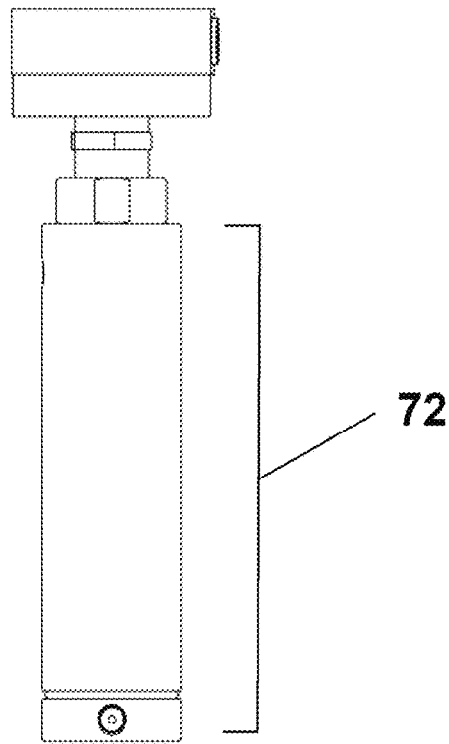
FIG. 13B is a frontal view of the invention of FIG. 13A
Figure 13C:
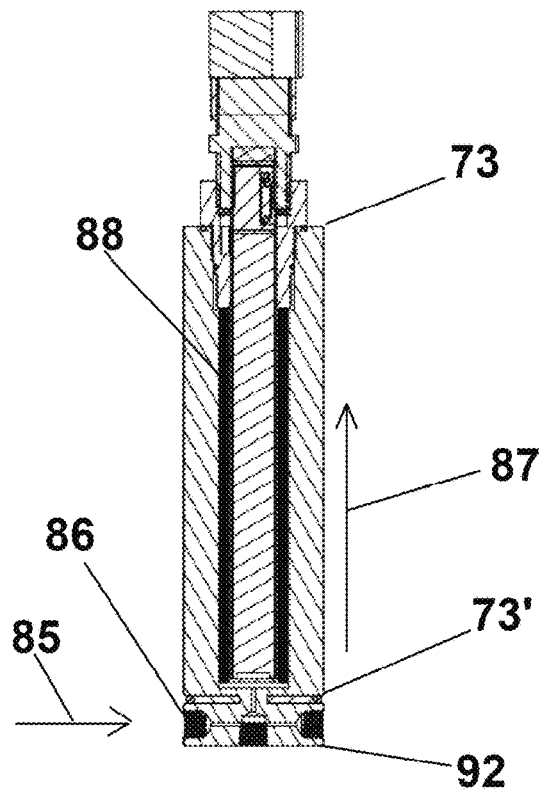
FIG. 13C is a side, cross-section view of the invention of FIG. 13A, further showing an internal view of the construction of the second embodiment of the present invention.
Figure 13D:
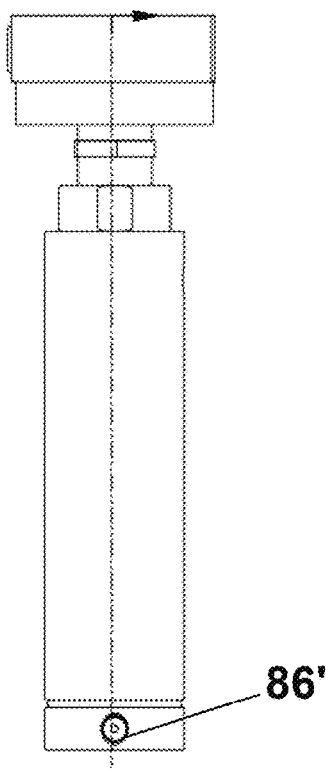
FIG. 13D is a rear view of the invention of 13C.
Figure 15A:
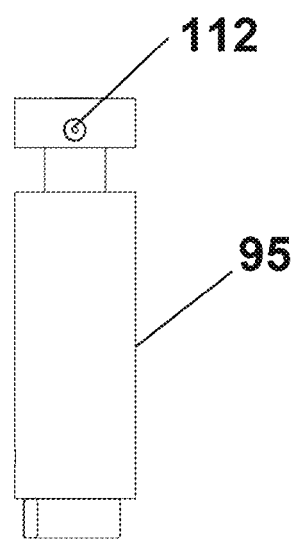
FIG. 15A is a frontal view of a first embodiment of the vaporizing pressure reducing module where the applicant's prior art vaporizer is modified by shortening the body and elongating the thermal isolation section to make room for a pressure reducing piston housing and piston.
Figure 15B:
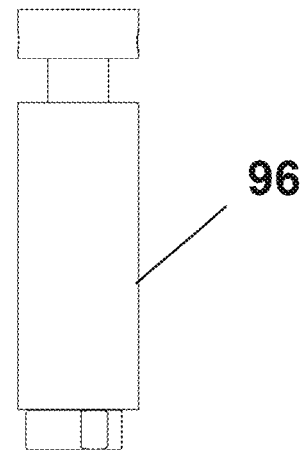
FIG. 15B is a rear view of the invention of FIG. 15A.

Referring to FIGS. 10A and 11A, heat trace 33 can have mounted thereto power cord connector 33" formed to engage power cord receiver 34" at tube bundle boot 35, providing low voltage power to power cord 34' from the tube boot 35 to the component(s) requiring power via wire conduit 139, for example heater block 137 of heated regulator 136. Power line from tube bundle is inside conduit shown at rear of boot with heat shrink interface and follows inside conduit to GHR heater block.

Alternatively, a separate power cord from the tube bundle, when available, can be utilized to provide electricity. The power line would run through the tube bundle to wire conduit (139, FIG. 11A) at rear of boot and follows inside conduit to GHR heater block.

With either the heat trace power cord or separate power cord from the tube bundle, a heat shrink interface is preferably employed at the tube bundle boot to ensure the wire passing into the wire conduit is sealed off from the outside environment.

Two-Stage Heated Pressure Reducing Modular Regulator with Self-Limiting Heater Block The pressure reduction features disclosed in the above teachings can be employed to improve other devices. For example, applicant assignee's GHR, GENIE brand Heated Regulator 135 (FIG. 18) can be modified as shown in FIGS. 19-21B, wherein there is provided a new and innovative upgrade/retrofit comprising a two-stage, heated pressure-reducing, modular regulator 136 with self-limiting heater block 137 (FIGS. 19-21), where the prior art GHR base 135' (FIG. 18) is replaced with a reconfigured base 140 (FIGS. 19-21B) formed to receive a pressure reducer modular component 141, and, when desired (in lieu of a 110-277v heater block such as, for example, the SL Blocktherm C by Intertec of Houston, Tex. www.intertek.info) an alternative, lower voltage, heat-trace powered heater block can be provided, with the other parts from the prior system remaining.

Referring to FIGS. 19-21B, the heater block 137 of the preferred embodiment of the present invention is formed of a block of thermally conductive material (for example, stainless steel) to directly or indirectly (e.g., via power cord extension from tube bundle boot) receive power from power cord 34', which can come from a dedicated power cord in the tube bundle or a power cord from the heat trace (via the trace power connector), depending on availability, the power cord powering the heater block (see discussion of FIG. 10A, above) to provide heat to the regulator base 140, so as to provide heat exchange to fluid flowing through the regulator.

The reconfigured base 140 of the present invention has formed therein an inlet 152 for receiving incoming fluid 153, the inlet providing passage to a pressure reducer component receiver 149 formed in base 140 for receiving 150 pressure reducer component 141 comprising piston housing 142, piston 143, the pressure reducer component providing a predetermined pressure reduction or cut of the fluid flowing therein, and includes similar components and functionality to that discussed with the pressure reducer component (124) of the vaporizer (FIGS. 15A-17G), supra. Incoming fluid 153 flowing into inlet 152 is thereby reduced in pressure via pressure reducer component 141 downstream of inlet, the reduced pressure fluid then flowing via passage 148 to the regulator upper 147 for conditioning (via regulator components 151). The base 140 further having formed therein passage 148' leading from the upper 147 portion to outlet 146, providing regulated fluid, having passed through regulator components 151 (the regulator function adjustable via adjuster bolt 154 (FIG. 21F)).

Based on empirical evidence, to facilitate capillary action in wet gas flowing through the system (end thereby prevent disassociation of the wet gas components), it is believed the passage through the base 149, including inlet 146 as well as piston 143 in the pressure reducer component receiver 149 should be no greater than 1/32" ID.

In the embodiment of FIGS. 21C-21G, as opposed to the fluid flowing directly into pressure reducer component receiver (and pressure reducer components) as shown in the above FIGS. 19-21B, FIGS. 21C-21G illustrates an alternative base 137' wherein there is provided an inlet 152' separate from pressure reducer component receiver 149', wherein fluid flows into inlet 152' then to pressure reducer component 141 where the pressure reduction occurs via passage 152", then on to the regulator components as in the previous embodiment.

Alternatively (not shown in the figures), in some situations a pressure reducer component in a receiver may be formed in association with outlet passage (as opposed to the inlet passage as discussed above), so that, once fluid flows through and is conditioned by the conditioning component (e.g., a regulator) it then passes through the pressure reducer component, providing reduced pressure flow, then out of the regulator base via outlet passage.

The components in the present invention as shown are not intended to be limiting, as other components may be utilized in the present system. For example, another embodiment of the present invention could utilize the A+ GENIE brand Membrane Separator with Liquid Block (as shown in U.S. Pat. No. 7,555,964, a CIP of U.S. Pat. No. 7,097,693 (listing the present Inventor St. Amant as second Inventor, the contents of which are incorporated herein by reference thereto) just before the analyzer as a means of protection for use in case of power failure of the heater block resulting in liquids not being vaporized in the modular sample conditioning system, as a Genie Membrane Separator with Liquid Block would protect the analyzer from the liquids that would then be present since the liquids would not be vaporized if the power fails. I want to be able to use our own Genie Membrane Separators in every embodiment before the analyzer.

Elements of the Invention
A—Analyzer
L—Longitudinal Axis of Probe tip 3
D—Screen Disc
D'—Spring Retainer
M,'—Mounted
I—Insert
P—Power Cord Receiver
C—Pipeline
1—Insertion Probe
2—Gas with entrained liquids
2'—Fluid flow
3—Slotted probe tip
4—Probe isolation valve
5—Substrate coupling
6—Modular sample conditioning system
7—VPM inlet
8—Vaporizing pressure reducing module (VPM)
9—Bracket—modular sample conditioning system
10—Enclosure
11—Probe passage
12—Medial area of pipe/stream
13—OD of probe
14—Rack length
15—Body
16, 16'—Insertion probe first, second ends
17, 17'—Body 15 first, second ends
18—Outer wall
19,',"—slot, width, length
20, 20'—Outer, inner edges
21, 21'—Outflow passage
22—Threaded end
23, 23'—ID of outflow passage, Capillary Tube
24—Capillary Tube
25, 25'—First, second ends
26—Receiver
27—Flow component
28—Threaded aperture
28'—Screen
29—Tube bundle
30—Tube bundle cover
31—Tube bundle insulation
32—⅛" OD stainless steel sample tube
33,',''' Heat trace, end termination, power cord connector
34', "—Power from power cord in tube bundle (separate from heat trace) or power cord from heat trace, power cord connector
35—Tube bundle boot
36—Liquid Bypass
37—Conduction Heater Block, 37' Bracket, 37" Width
38—Modular Vaporizer Bottom Cap, 38' Raised center area
39—Modular Vaporizer Chamber, 39' ID
40—GENIE brand Heated Regulator Top
41—GENIE brand Heated Regulator Bottom
42—Modular Vaporizer Bottom
43—Thermal Isolation Barrier
44—Radiant Heat Sink
45—Capillary Action Tube, 45' vaporizer outlet
46—Heat Pipe
47—Post Regulation Heat Exchanger
48—JTR Modular Vaporizer Bottom
49—Regulator Outlet Port
50—Regulator Heater Block
51—Bracket
52—JTR Modular Component configured for pressure regulation
53, 53' stacked regulator stages which can be used to provide incremental pressure reduction
54 probe tip outlet
62 capillary passage
70 vaporizer
71 body
72 length, 72
73,' first, second ends
74 longitudinally
75 receiver
76 ID
77,' thermally conducting mass, brass rod
78', length, OD
79 fitting
80 mounting plate
81 heater block
82 threaded connection
83 thermal connector
84 mesh
85 fluid
86,' fluid inlet port
87 flow
88 clearance
89 outlet port
90 heat trace extension via tube bundle boot
91 inserted
95 vaporizer
96 body
97 length
98,' first, second ends
99 receiver
100 longitudinal axis
101 heater receptacle
102 opening
103 threaded base
104 heater receptacle
105 thermal conductor sleeve
106 heater core
107 mesh screen
108 OD thermal conducting mass 109 inner wall/ID of receiver
110 fluid
111 flowing
112 fluid inlet port
113 vaporization chamber
114 clearance
115 outlet gas port
116 probe passage ID
117,'O-ring
118 out
119 capillary flow passage from probe
120,' thermal isolation section, prior art
121 elongated
122 thermal isolation barrier
123 neck
124 pressure reducer component
125 piston housing
126,' piston, second piston
127,' pressure reducer/component receiver, extended
128 insert
129
130 passage
135,' Genie brand heated regulator, body
136 heated regulator with pressure reduction
137 heater block
138 thermal connector
139 wire conduit
140,' base
141 pressure reducer component
142 piston housing
143 piston
144 fluid
145 flowing
146 outlet
147 regulator upper
148,' passage
149,' pressure reducer component receiver
150 receiving
151 regulator components
152,',″ inlet passage
153,' inflow, outflow
154 regulator adjusting bolt The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

I claim:

1. A device for vaporizing a wet gas, comprising:
   a vaporizer, comprising
   an inlet providing flow to a component receiver;
   a pressure reducing component formed to be inserted via said inlet to engage said component receiver, so that wet gas flowing into said inlet flows to said pressure reducing component;
   a vaporization chamber receiving flow from said pressure reducing component; and
   a heater associated with said vaporization chamber.

2. The device of claim 1, wherein said heater comprises an electric heater.

3. The device of claim 1, wherein said heater comprises a self-limiting heater block.

4. The device of claim 3, wherein said heater block comprises a thermal conductor.

5. The device of claim 4, wherein said heater block thermally engages said vaporization chamber.

6. The device of claim 5, wherein said heater block thermally engages a thermally conducting rod situated in said vaporization chamber.

7. The device of claim 6, wherein said thermally conducting rod comprises brass.

8. The device of claim 7, wherein said heat trace engages a tube bundle boot.

9. The device of claim 6, wherein said there is further provided a heat trace configured to provide power to said heater.

10. The device of claim 1, wherein said pressure reducing component comprises a piston providing a fixed pressure reduction based on its diameter.

11. The device of claim 1, wherein said pressure reducing component passes through said inlet to engage said receiver.

12. The device of claim 11, wherein wet gas flowing into said inlet flows through said pressure reducing component.

13. The device of claim 12, wherein there is provided a vaporized gas flow passage downstream said vaporizer to an adjustable regulator.

14. The device of claim 12, wherein wet gas flowing through said pressure reducing component flows into said vaporization chamber.

15. The device of claim 14, wherein said vaporizer inlet is formed to receive wet gas via a flow passage having a inner diameter of less than less than $1/32$″.

16. The device of claim 14 wherein said wet gas flows from a fluid stream having a flow velocity, and said vaporizer inlet is formed to receive said wet gas via a flow passage sized to facilitate the flow of wet gas therethrough at least at the flow velocity of said fluid stream.

17. The device of claim 14, wherein said pressure reducing component can be inserted or removed from said component receiver via said inlet.

18. The device of claim 17, wherein said pressure reducing component is selected from two or more pressure reducing components, each having a different pressure reducing specification, wherein the selected pressure reducing component provides the desired pressure reduction.

19. The device of claim 14, wherein said vaporizer inlet is formed to receive said wet gas via a capillary flow passage.

20. The device of claim 19, wherein said capillary flow passage comprises a capillary tube.

21. The device of claim 20, wherein said capillary flow passage provides flow from an insertion probe.

22. The device of claim 21, wherein said insertion probe comprises a slotted probe tip.

23. The device of claim 22, wherein said slotted probe tip is formed to facilitate capillary action in wet gas flowing therethrough to prevent disassociation thereof.

24. The device of claim 23, wherein said vaporizer inlet has a bypass mounted thereto, and said capillary flow passage extends from said insertion probe to said bypass.

25. A device for vaporizing a wet gas, comprising:
   a vaporizer, comprising
   an inlet providing flow to a component receiver;
   a pressure reducing component formed to engage said component receiver via said inlet, such that wet gas flowing through said inlet flows through said pressure reducing component;
   a vaporization chamber formed to receive flow from said pressure reducing component; and
   a heater associated with said vaporization chamber;
   wherein said vaporizer inlet is formed to receive wet gas via a capillary flow passage.

26. The device of claim 25, wherein said heater thermally engages a thermally conducting rod situated in said vaporization chamber.

27. The device of claim 26, wherein said there is further provided a heat trace configured to provide power to said heater.

28. The device of claim 25, wherein said pressure reducing component comprises a piston providing a fixed pressure reduction based on its diameter.

29. The device of claim 25, wherein said capillary flow passage comprises a capillary tube fluidly engaging said vaporizer inlet.

30. The device of claim 29, wherein said capillary flow passage provides fluid flow from an insertion probe.

31. The device of claim 30, wherein said vaporizer inlet has a bypass mounted thereto, and said capillary flow passage extends from said insertion probe to said bypass.

32. The device of claim 30, wherein said insertion probe comprises a slotted probe tip.

33. The device of claim 32, wherein said slotted probe tip is formed to facilitate capillary action in wet gas flowing therethrough to prevent disassociation thereof.

34. The device of claim 29, wherein said capillary tube has an inner diameter of less than less than $1/32"$.

35. The device of claim 25 wherein said wet gas flows from a fluid stream having a flow velocity, and said vaporizer inlet is formed to receive said wet gas via a flow passage sized to facilitate the flow of wet gas therethrough at least at the flow velocity of said fluid stream.

36. The device of claim 25, wherein said pressure reducing component can be inserted or removed from said component receiver via said inlet.

37. The device of claim 36, wherein said pressure reducing component is selected from two or more pressure reducing components, each having a different pressure reducing specification, wherein the selected pressure reducing component provides the desired pressure reduction.

38. The device of claim 37, wherein there is provided a vaporized gas flow passage downstream said vaporizer to an adjustable regulator.

* * * * *